(12) United States Patent
Takahashi

(10) Patent No.: US 8,300,334 B2
(45) Date of Patent: Oct. 30, 2012

(54) VARIABLE POWER LENS

(75) Inventor: Kazunori Takahashi, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 388 days.

(21) Appl. No.: 12/603,693

(22) Filed: Oct. 22, 2009

(65) Prior Publication Data

US 2010/0103543 A1    Apr. 29, 2010

(30) Foreign Application Priority Data

Oct. 24, 2008  (JP) ................. 2008-274174
Sep. 2, 2009   (JP) ................. 2009-202168

(51) Int. Cl.
*G02B 7/02* (2006.01)

(52) U.S. Cl. ............ 359/825; 359/822; 359/823

(58) Field of Classification Search .......... 359/694, 359/696, 823–825; 396/79, 133, 463, 529
See application file for complete search history.

(56) References Cited

U.S. PATENT DOCUMENTS

| | | | |
|---|---|---|---|
| 4,346,967 A | 8/1982 | Komoto et al. | |
| 4,387,968 A | 6/1983 | Sekiguchi | |
| 5,148,199 A | 9/1992 | Kohmoto et al. | |
| 5,448,414 A | 9/1995 | Hamasaki et al. | |
| 5,576,894 A | 11/1996 | Kuwana et al. | |
| 6,333,825 B1 | 12/2001 | Hamasaki et al. | |
| 6,631,035 B2 | 10/2003 | Iikawa et al. | |
| 7,013,082 B2 * | 3/2006 | Kaneda et al. | ........... 396/85 |
| 7,184,228 B2 | 2/2007 | Hamasaki et al. | |
| 2002/0036844 A1 | 3/2002 | Nomura et al. | |
| 2002/0135887 A1 | 9/2002 | Nomura et al. | |
| 2002/0135901 A1 | 9/2002 | Nomura et al. | |
| 2002/0135903 A1 * | 9/2002 | Nomura et al. | ........... 359/823 |
| 2004/0136090 A1 * | 7/2004 | Iikawa et al. | ........... 359/694 |
| 2009/0231732 A1 | 9/2009 | Sasaki | |

FOREIGN PATENT DOCUMENTS

JP   2006-145562   6/2006

* cited by examiner

*Primary Examiner* — Ricky Mack
*Assistant Examiner* — Mahidere Sahle
(74) *Attorney, Agent, or Firm* — Greenblum & Bernstein, P.L.C.

(57) ABSTRACT

A variable power lens, having first and second lens groups, includes first and second lens group support frames, a linear guide ring, first and second lens group drive rings which rotate to move the first and second lens group support rings in the optical axis direction relative to the linear guide ring, a drive ring coupler which couples the first and second lens group drive rings with each other to prevent relative rotation therebetween while allowing relative movement therebetween in the optical axis direction; and a drive-ring movement controller which integrally rotates the first and second lens group drive rings via the drive ring coupler without relatively moving in the optical axis direction when a power-variation operating member is operated, and moves one of the first and the second lens group drive rings in the optical axis direction without rotating when a focus operating member is operated.

18 Claims, 31 Drawing Sheets

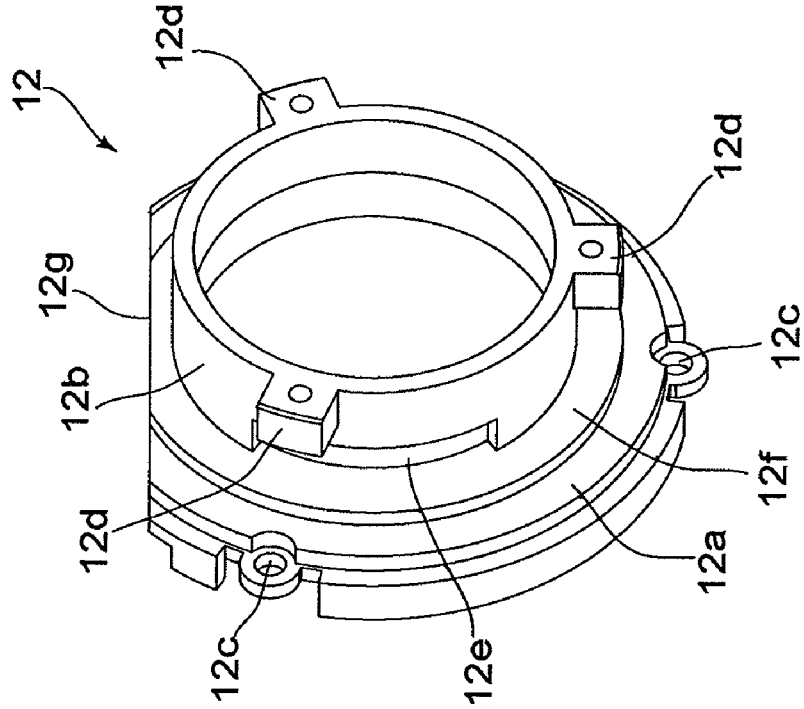
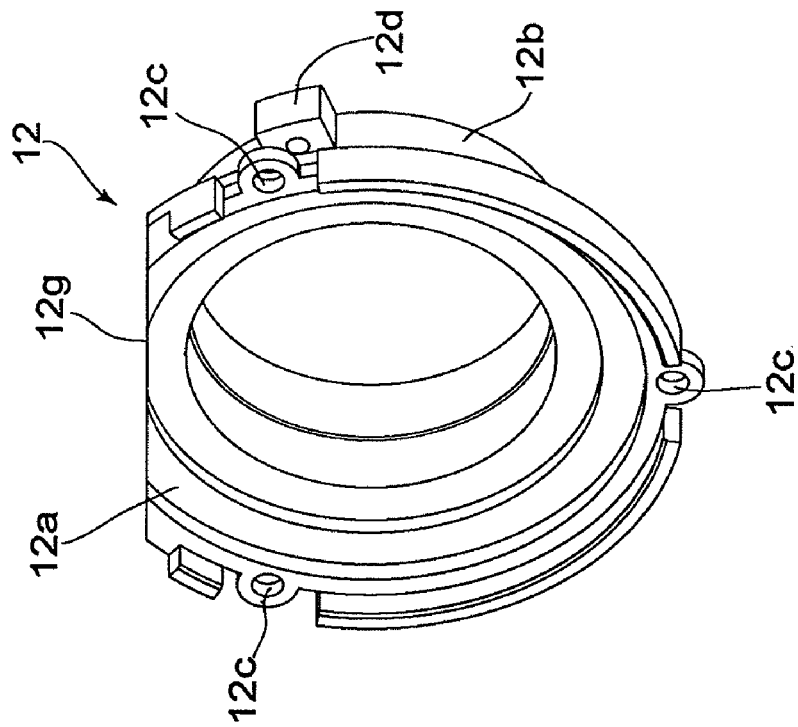

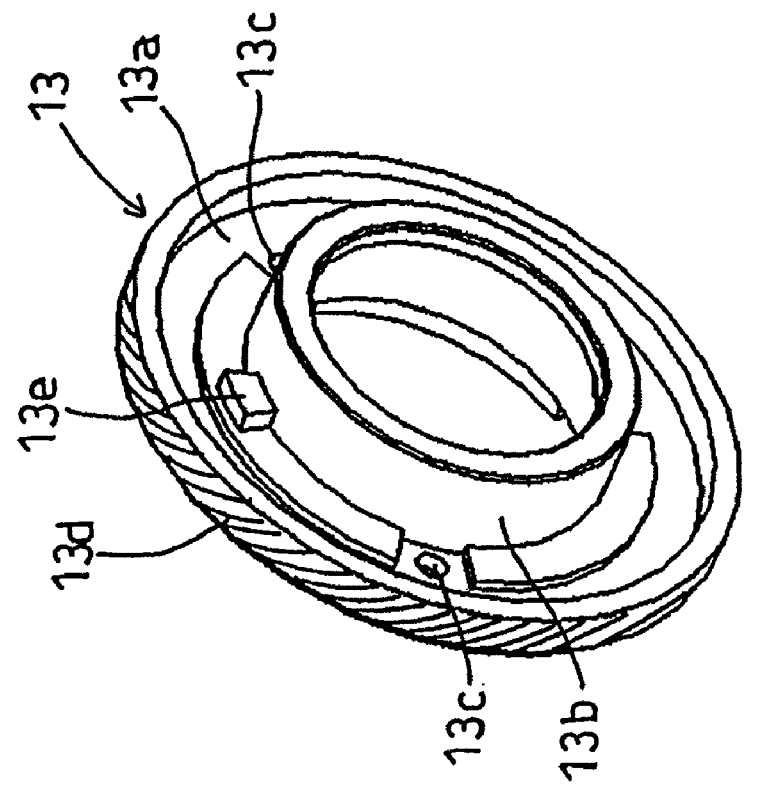
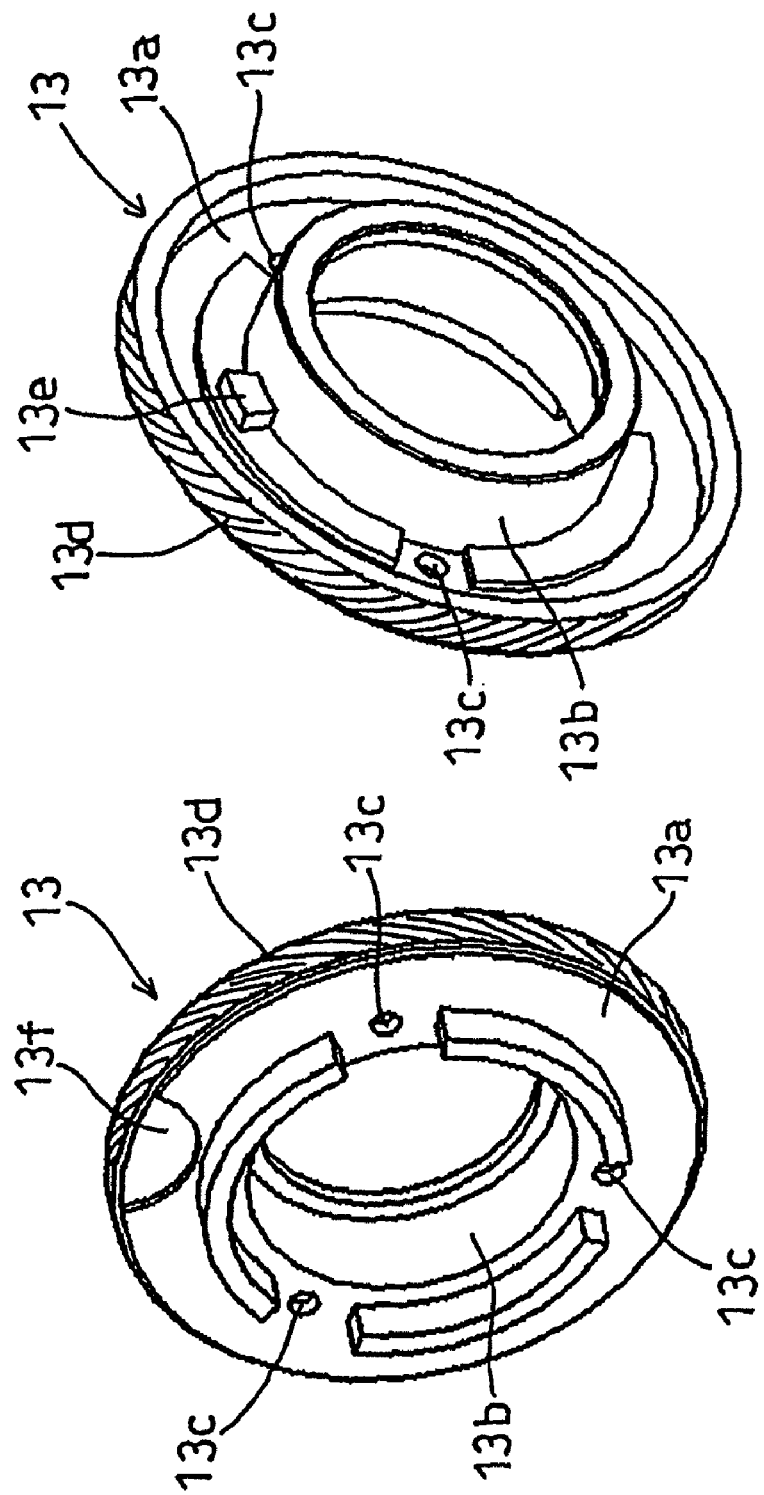
Fig. 9A
Fig. 9B

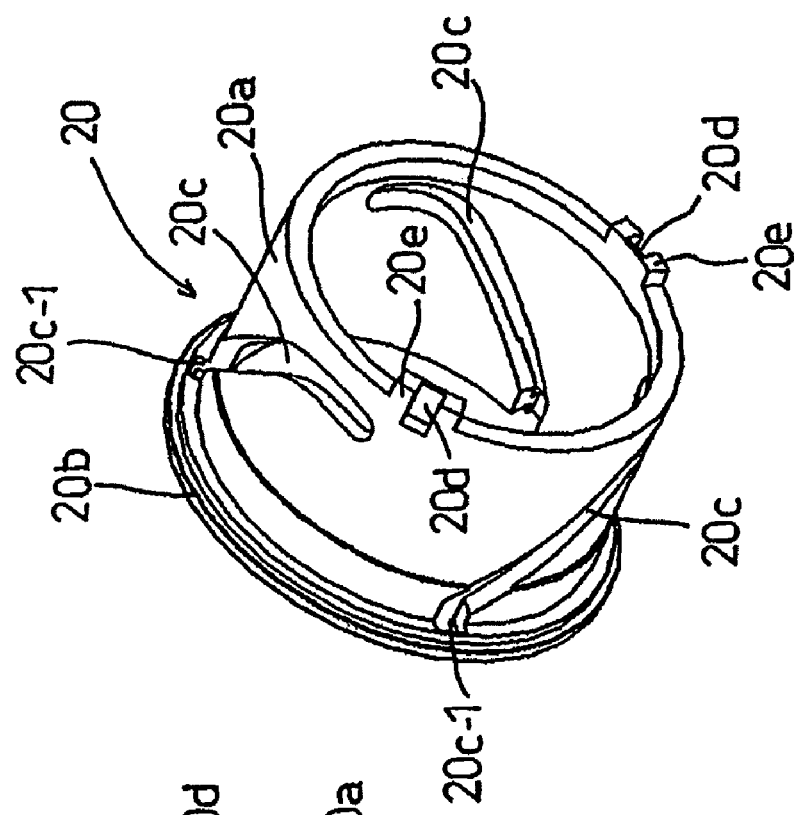
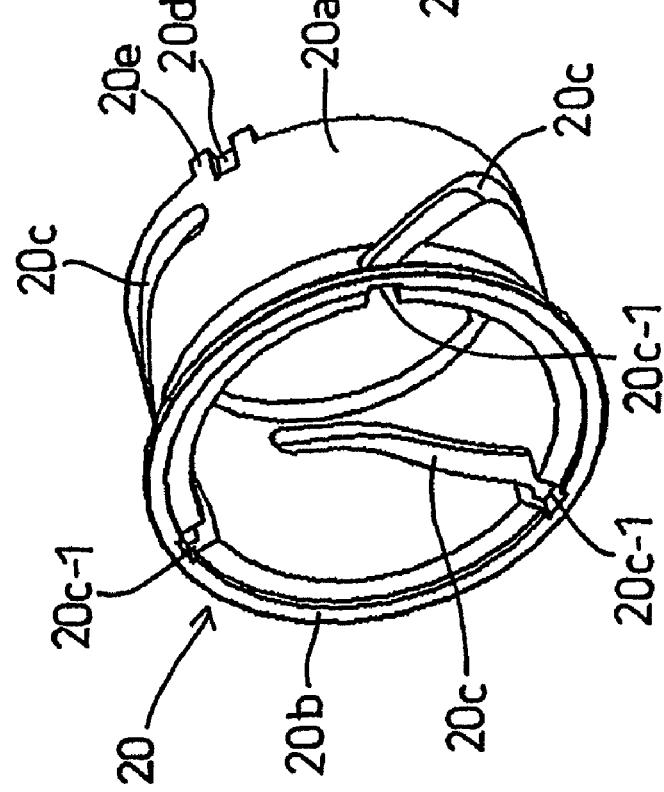

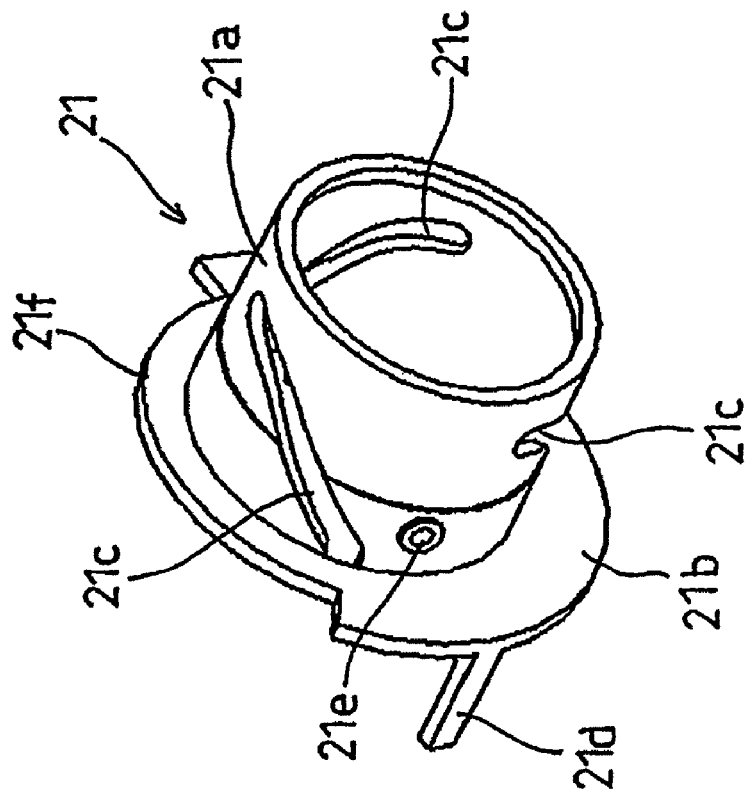
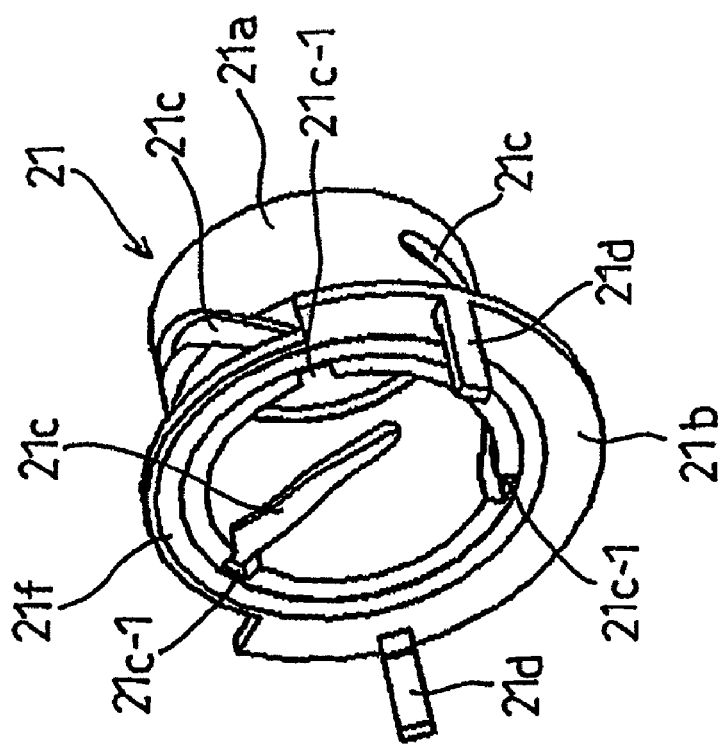
Fig. 11B
Fig. 11A

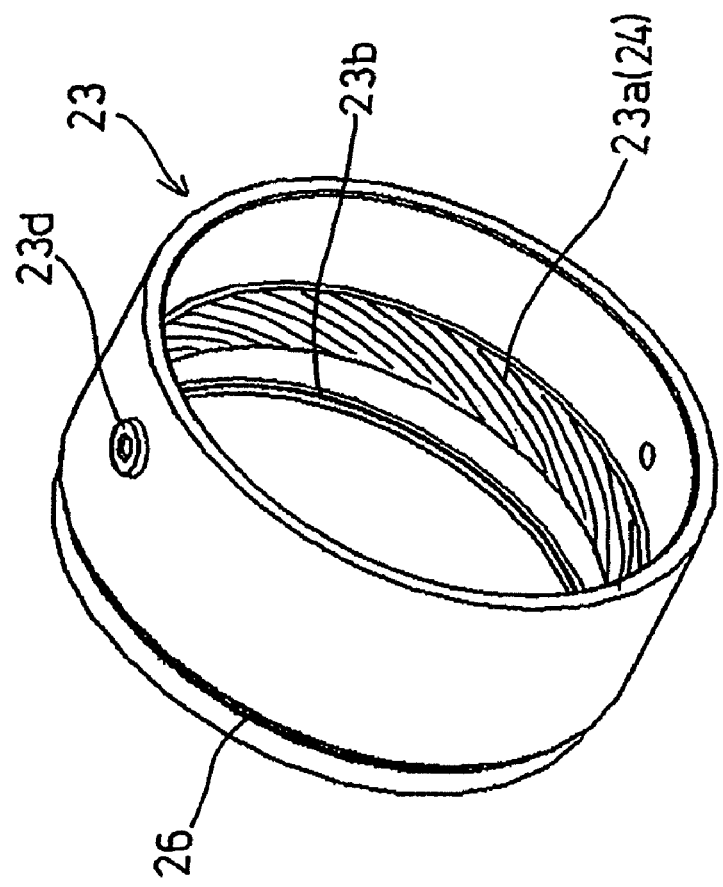
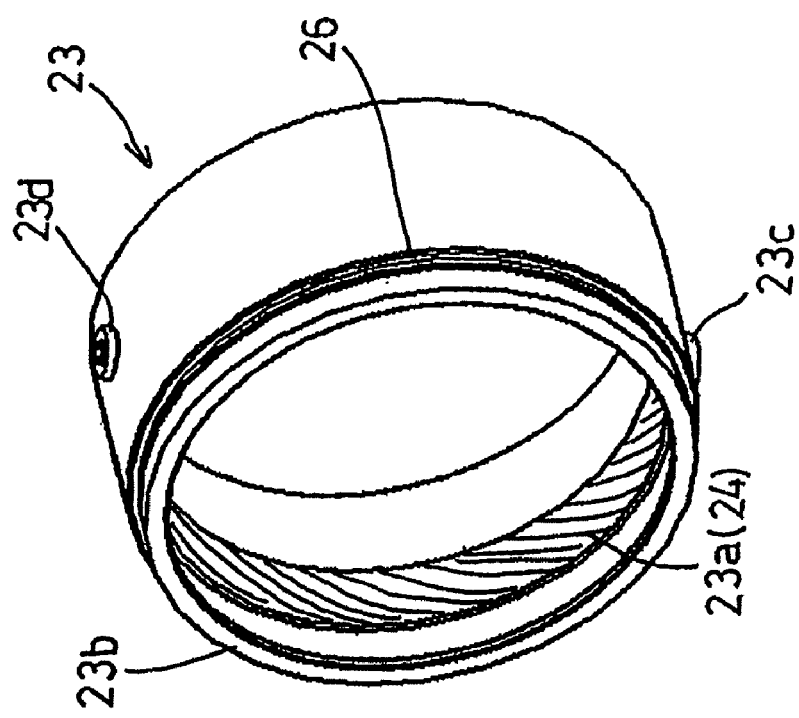

VARIABLE POWER LENS

BACKGROUND OF THE INVENTION

1. Field of the Invention

The present invention relates to a variable power lens with a variable focal length, and in particular relates to a variable power lens equipped with a driving mechanism for controlling the positions of a plurality of lens groups in an optical axis direction.

2. Description of the Related Art

In conventional variable power lenses such as zoom lenses or varifocal lenses, it is often the case that a plurality of lens groups are guided in an optical axis direction by different types of cams (e.g., cam grooves or slots) formed on a single cam ring, such as in the lens barrel disclosed in Japanese Unexamined Patent Publication No. 2006-145562. In addition, a specific lens group is moved in an optical axis direction by a mechanism different from that for power variation when a focusing operation is carried out.

However, in the case where the variable power lens is provided in a lens barrel with a large intermediate member that is so large as to partition an internal space of the lens barrel, there is a possibility of a rotational ring such as a cam ring interfering with such an intermediate member, and accordingly, it is sometimes difficult for the variable power lens to be provided therein with a long rotational ring having a long length in an optical axis direction. For instance, this restriction tends to arise in a particular type of camera lens for CCTV (closed-circuit television) cameras in which a large auto iris is installed at some midpoint in an optical system.

SUMMARY OF THE INVENTION

The present invention has been devised in view of the problems described above and provides a variable power lens equipped with a lens group driving mechanism for power variation and focusing which is not subject to restrictions by the internal space of the lens barrel.

According to an aspect of the present invention, a variable power lens is provided, having an imaging optical system including at least a first lens group and a second lens group which are movable in an optical axis direction, the variable power lens including a first lens group support frame and a second lens group support frame which support the first lens group and the second lens group, respectively; a linear guide ring which linearly guides each of the first lens group support frame and the second lens group support frame in the optical axis direction; a power-variation operating member; a focus operating member; a first lens group drive ring which moves the first lens group support ring in the optical axis direction by rotation of the first lens group drive ring relative to the linear guide ring; a second lens group drive ring which moves the second lens group support ring in the optical axis direction by rotation of the second lens group drive ring relative to the linear guide ring; a drive ring coupler which couples the first lens group drive ring and the second lens group drive ring with each other in a manner to prevent the first lens group drive ring and the second lens group drive ring from rotating relative to each other while allowing the first lens group drive ring and the second lens group drive ring to move relative to each other in the optical axis direction; and a drive-ring movement controller which integrally rotates the first lens group drive ring and the second lens group drive ring via the drive ring coupler with a relative position therebetween in the optical axis direction remaining unchanged when the power-variation operating member is manually operated, and moves only one of the first lens group drive ring and the second lens group drive ring in the optical axis direction without rotating when the focus operating member is manually operated.

The present invention is useful especially for a type of variable power lens having a light-quantity controller at a position in the optical axis direction between the first lens group drive ring and second lens group drive ring. It is desirable for the variable power lens to include a light-quantity controller installed at a position in the optical axis direction between the first lens group drive ring and the second lens group drive ring. The drive ring coupler includes at least one rotation transmission key which passes through a space immediately beside the light-quantity controller to extend in the optical axis direction from one of the first lens group drive ring and the second lens group drive ring, and at least one key groove which is formed on the other of the first lens group drive ring and the second lens group drive ring, wherein the key groove is engaged in the rotation transmission key so as to be slidably movable in the optical axis direction and to be prevented from relatively rotating thereto.

The drive ring coupler including at least one rotation transmission key and a corresponding key groove(s) occupies less space than a completely (circumferentially non-discontinuous) annular coupling structure. Therefore, even if there are spatial restrictions, the coupling structure including at least one rotation transmission key and a corresponding key groove(s) enables the first lens group drive ring and the second lens group drive ring to integrally rotate when a power varying operation (e.g., a zooming operation in the case of a zoom lens) is performed, thus enabling the first lens group drive ring and the second lens group drive ring to function as substantially an integrally-constructed lens group drive ring. In addition, according to the coupling structure including at least one rotation transmission key and a corresponding key groove (s), one of the first and second lens group drive rings can be securely stopped while allowing the other of the first and second lens group drive rings to move in the optical axis direction when a focusing operation is performed.

It is desirable for the linear guide ring to include a large-diameter cylinder and a small-diameter cylinder which are mutually different in diameter and coaxially arranged, the large-diameter cylinder being positioned in front of the small-diameter cylinder in the optical axis direction, and a middle flange which extends radially to connect the large-diameter cylinder and the small-diameter cylinder to each other. The first lens group drive ring and the second lens group drive ring include a front lens group drive ring which includes one of the rotation transmission key and the key groove, and is positioned inside the large-diameter cylinder and supported thereby to be rotatable relative to the large-diameter cylinder about the optical axis and movable relative to the large-diameter cylinder in the optical axis direction; and a rear lens group drive ring which includes the other of the rotation transmission key and the key groove, and is positioned outside the small-diameter cylinder and supported thereby to be rotatable relative to the small-diameter cylinder about the optical axis. At least one through-hole is formed through the middle flange in the optical axis direction, the rotation transmission key passing through the through-hole to extend in the optical axis direction.

The light-quantity controller can be inserted into an internal space of the large-diameter cylinder and supported thereby, the internal space being adjacent to the middle flange, and an insertion space is formed between an inner surface of the large-diameter cylinder and a side of the light-quantity controller so that the rotation transmission key can pass through the through-hole and the insertion space to extend in the optical axis direction.

It is desirable for the power-variation operating member to include a power varying ring which is positioned around the rear lens group drive ring and supported thereby so as to rotate integrally with the rear lens group drive ring.

It is desirable for the focus operating member to include a focus ring which is positioned around the large-diameter cylinder and supported thereby so as to move in the optical axis direction relative to the linear guide ring when being rotated manually. The drive-ring movement controller includes a focus ring coupler which couples the focus ring and the front lens group drive ring to each other in a manner to allow the focus ring and the front lens group drive ring to rotate relative to each other and to prevent the focus ring and the front lens group drive ring from moving relative to each other in the optical axis direction. The focus ring coupler prevents the front lens group drive ring from rotating in association with rotation of the focus ring when the focus ring is rotated, and prevents the focus ring from rotating in association with rotation of the front lens group drive ring when the front lens group drive ring is rotated via the power varying ring.

It is desirable for the focus ring coupler to include an annular flange formed on the front lens group drive ring to project radially outwards, a retaining ring which is detachably attached to a front end of the focus ring to prevent the annular flange of the front lens group drive ring from moving forward relative to the focus ring, and a biaser which biases the front lens group drive ring forward to bring the annular flange into contact with the retaining ring. According to this structure, it is possible to make the focus ring operate with high precision with less backlash and play because of the biasing force of the biaser.

Alternatively, it is desirable for the focus ring coupler to include a plurality of retaining lugs formed on the front lens group drive ring at different circumferential positions to project radially outwards, and a lug-engaging portion formed on the focus ring to allow all of the plurality of retaining lugs to be engaged therewith and disengaged therefrom when the focus ring is positioned at a specific rotational position relative to the front lens group drive ring. The lug-engaging portion prevents the focus ring from moving in the optical axis direction relative to the front lens group drive ring by being engaged with at least part of the plurality of retaining lugs when the focus ring is positioned at any other rotational position relative to the front lens group drive ring. According to this structure, the focus ring coupler can be simplified and low-priced, having a small number of components.

Although the numbers and the formation positions of the rotation transmission keys and the key grooves that are respectively formed on one and the other of the first and second lens group drive rings are optional, a pair of rotation transmission keys can be formed on, e.g., one and the other of the first and second lens group drive rings at different circumferential positions while a corresponding pair of key grooves can be formed on the other of the first and second lens group drive rings at corresponding different circumferential positions. This structure achieves stability in the coupling and linkage between the front and rear lens group drive rings, and also achieves a further saving of space within the lens barrel.

Although space utilization and stable driving can both be achieved if the drive ring coupler is composed of at least one rotation transmission key and a corresponding key groove(s) as described above, the drive ring coupler can be provided without using such a combination of key and key groove. Regardless of what type of drive ring coupler that is adopted, it is desirable that the variable power lens according to the present invention adopt the following basic structure. Firstly, it is desirable for the linear guide ring to include a large-diameter cylinder and a small-diameter cylinder which are coaxially arranged and mutually different in diameter, the large-diameter cylinder being positioned in front of the small-diameter cylinder in the optical axis direction. It is desirable for the first lens group drive ring and the second lens group drive ring to include a front lens group drive ring which is positioned inside the large-diameter cylinder and supported thereby to be rotatable relative to the large-diameter cylinder about the optical axis and movable relative to the large-diameter cylinder in the optical axis direction; and a rear lens group drive ring which is positioned outside the small-diameter cylinder and supported thereby to be rotatable relative to the small-diameter cylinder about the optical axis. The power-variation operating member includes a power varying ring which is provided around the rear lens group drive ring and supported thereby so as to rotate integrally with the rear lens group drive ring. The focus operating member includes a focus ring which is provided around the large-diameter cylinder and supported thereby so as to move in the optical axis direction relative to the linear guide ring when being rotated manually. The drive-ring movement controller includes a focus ring coupler which couples the focus ring and the front lens group drive ring to each other in a manner to allow the focus ring and the front lens group drive ring to rotate relative to each other and to prevent the focus ring and the front lens group drive ring from moving relative to each other in the optical axis direction. The focus ring coupler prevents the front lens group drive ring from rotating in association with rotation of the focus ring when the focus ring is rotated, and prevents the focus ring from rotating in association with rotation of the front lens group drive ring when the front lens group drive ring is rotated via the power varying ring.

In the variable power lens according to the present invention, the mechanism for enabling the focus ring to rotate while advancing and retracting relative to the linear guide ring can be any mechanism. However, if an inner peripheral surface of the focus ring and an outer peripheral surface of the linear guide ring includes a female helicoid and a male helicoid, respectively, which are screw-engaged with each other, a rotation of the focus ring causing the focus ring to move in the optical axis direction relative to the linear guide ring due to a screw-engagement between the female helicoid and the male helicoid, it is possible to make the variable power lens perform a focusing operation with high precision.

Additionally, the drive mechanism between the first lens group drive ring (the front lens group drive ring) and the associated lens group support frame and the drive mechanism between the second lens group drive ring (the rear lens group drive ring) can also be any mechanism. However, it is desirable that each of these drive mechanisms be constructed such that the first lens group drive ring and the second lens group drive ring include a first cam ring and a second cam ring, each of which includes at least one cam groove on a peripheral surface thereof. The first lens group support frame includes at least one cam follower which slidably engages in the cam groove of the first cam ring; and at least one linear guide projection which engages in a corresponding linear guide groove which is formed on the linear guide ring to extend in the optical axis direction. The second lens group support frame includes at least one cam follower which slidably engages in the cam groove of the second cam ring, and at least one linear guide projection which engages in a corresponding linear guide groove which is formed on the linear guide ring to extend in the optical axis direction.

It is desirable for the linear guide ring to be a stationary member which is fixed to a mount member, the mount member enabling the variable power lens to be mounted to and dismounted from a camera body.

When one of the first lens group drive ring and the second lens group drive ring is moved in the optical axis direction by an operation of the focus operating member, it is desirable for the movement of the one of the first lens group drive ring and the second lens group drive ring, which constitutes an amount of movement for focusing, to be determined by taking into account a focus adjustment amount required to compensate a variation in position of a focal plane due to a power variation.

In an embodiment a variable power lens provided with an imaging optical system is provided, including at least a first lens group and a second lens group which are movable in an optical axis direction, the variable power lens including a first lens group support frame and a second lens group support frame which support the first lens group and the second lens group, respectively; a linear guide ring which linearly guides each of the first lens group support frame and the second lens group support frame in the optical axis direction; a power-variation operating member; a focus operating member; a first lens group drive ring which moves the first lens group support ring in the optical axis direction by rotation of the first lens group drive ring relative to the linear guide ring; a second lens group drive ring which moves the second lens group support ring in the optical axis direction by rotation of the second lens group drive ring relative to the linear guide ring; and a drive ring coupler which couples the first lens group drive ring and the second lens group drive ring with each other in a manner to prevent the first lens group drive ring and the second lens group drive ring from rotating relative to each other while allowing the first lens group drive ring and the second lens group drive ring to move relative to each other in the optical axis direction. The first lens group drive ring and the second lens group drive ring are integrally rotated with a relative position therebetween in the optical axis direction remaining unchanged when the power-variation operating member is manually operated. Only one of the first lens group drive ring and the second lens group drive ring is moved in the optical axis direction without rotating when the focus operating member is manually operated.

According to the present invention, since the variable power lens is equipped with two lens group drive rings for driving and controlling the support frames for at least two lens groups independently of each other, and since the two lens group drive rings are driven to integrally rotate without changing the relative position therebetween in an optical axis direction when a power varying operation is performed, a power varying operation can be performed by drive control similar to that for a conventional type of variable power lens in which a plurality of lens groups is driven by a single drive ring. In addition, since a focusing operation is performed by advancing and retracting one of the first and second lens group drive rings itself in an optical axis direction, the structure of the drive mechanism for focusing can be simplified. Furthermore, the coupled portion between the two lens group drive rings that have such a linkage relationship can be made without the use of a completely-annular member, which makes a space-saving arrangement possible. Consequently, a variable power lens with a lens group drive mechanism which is not susceptible to spatial restrictions by an internal space of the lens barrel is achieved.

The present disclosure relates to subject matter contained in Japanese Patent Applications Nos. 2008-274174 (filed on Oct. 24, 2008) and 2009-202168 (filed on Sep. 2, 2009) which are expressly incorporated herein by reference in their entireties.

BRIEF DESCRIPTION OF THE DRAWINGS

The present invention will be described below in detail with reference to the accompanying drawings in which:

FIG. 8A is a front perspective view of a stationary relay ring;

FIG. 8B is a rear perspective view of the stationary relay ring;

FIG. 9A is a front perspective view of a rear decorative ring;

FIG. 9B is a rear perspective view of the rear decorative ring;

FIG. 10A is a front perspective view of a front cam ring;

FIG. 10B is a rear perspective view of the front cam ring;

FIG. 11A is a front perspective view of a rear cam ring;

FIG. 11B is a rear perspective view of the rear cam ring;

FIG. 12A is a front perspective view of a focus ring;

FIG. 12B is a rear perspective view of the focus ring;

DESCRIPTION OF THE PREFERRED EMBODIMENTS

A variable power lens (variable-power lens barrel) 10, the overall structure of which is shown in FIGS. 1 through 4, of the present invention is for used in a CCTV camera. The variable power lens 10 is provided with an imaging optical system having a front lens group L1 and a rear lens group L2. In the following descriptions, the direction along an optical axis O of this imaging optical system is referred to as an optical axis direction, and the object side and the image plane side are referred to as forward side and rearward side, respectively.

Figure 4:
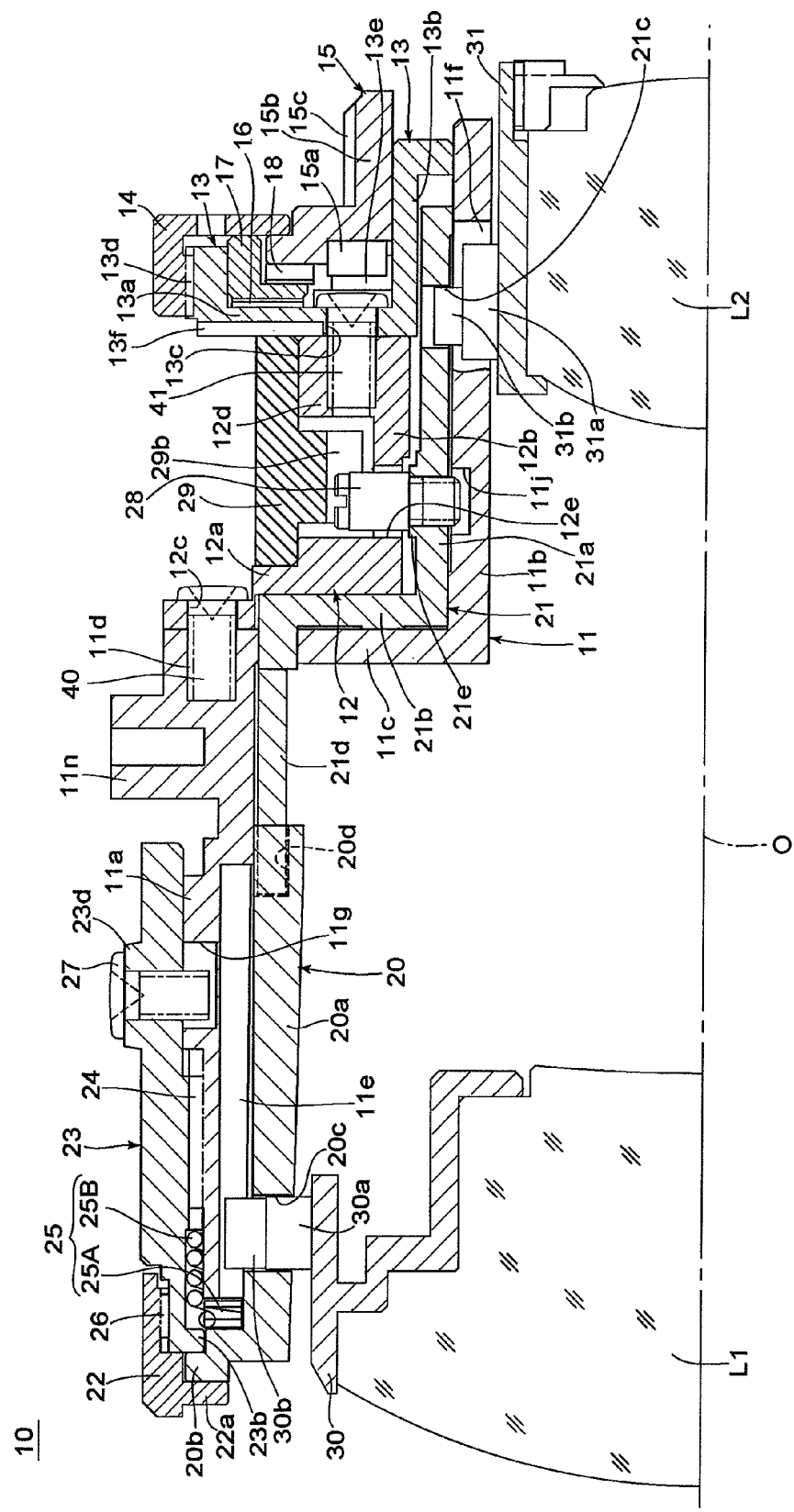
FIG. 4 is a longitudinal cross section of the upper half of the variable power lens.
Figure 5:
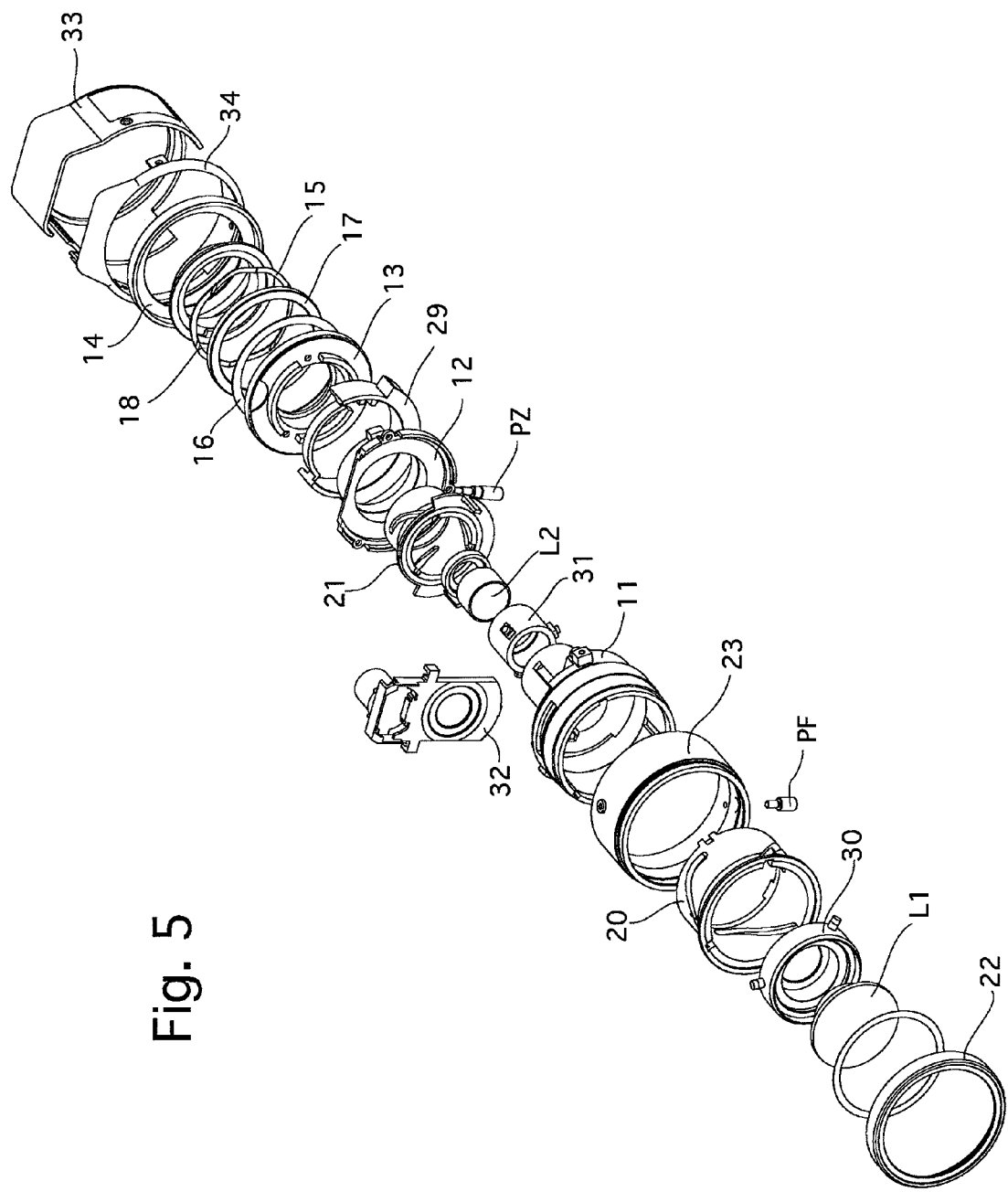
FIG. 5 is a front exploded perspective view of main elements of the variable power lens.
Figure 6:
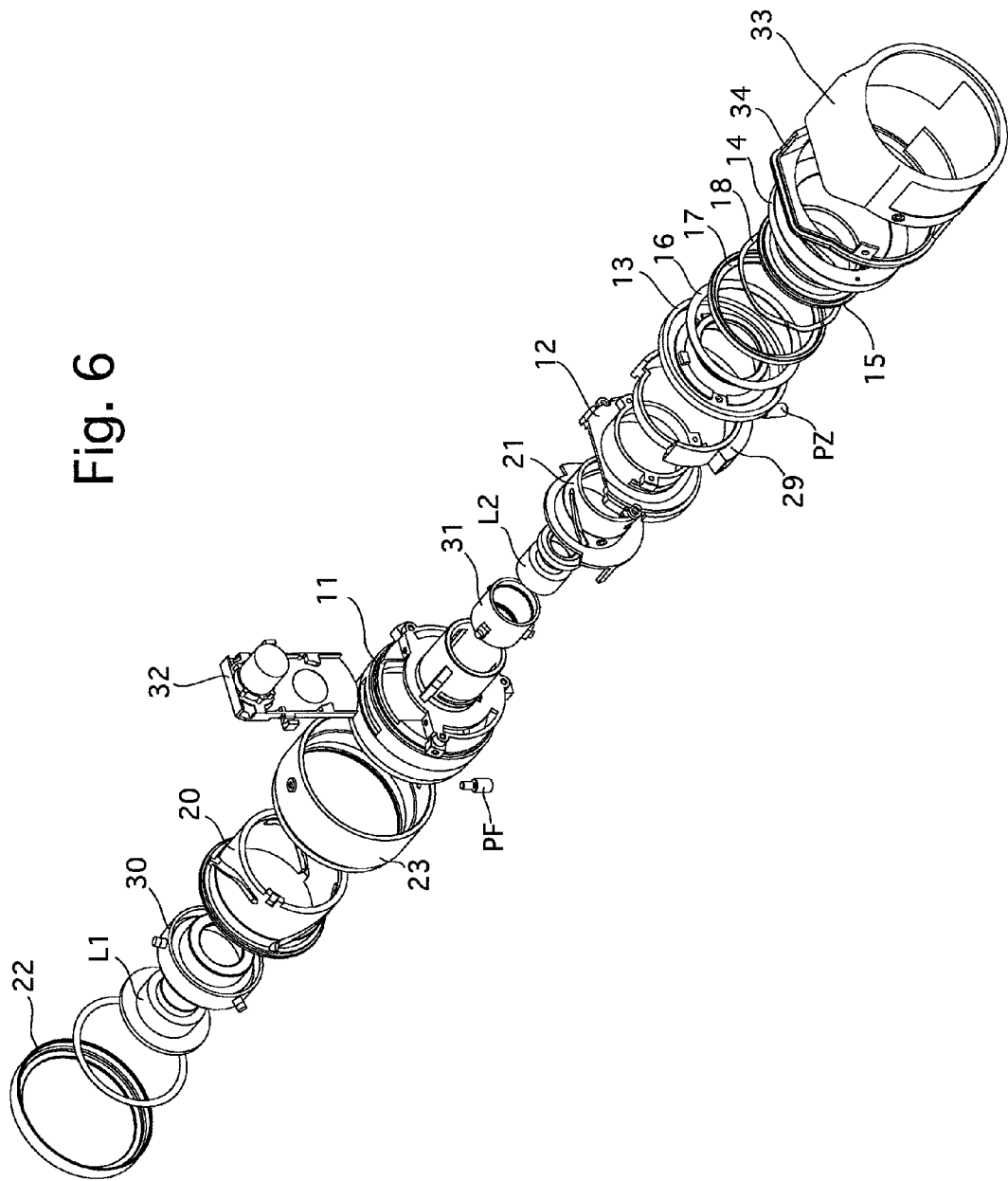
FIG. 6 is a rear exploded perspective view of the elements shown in FIG. 5.
Figure 7A:
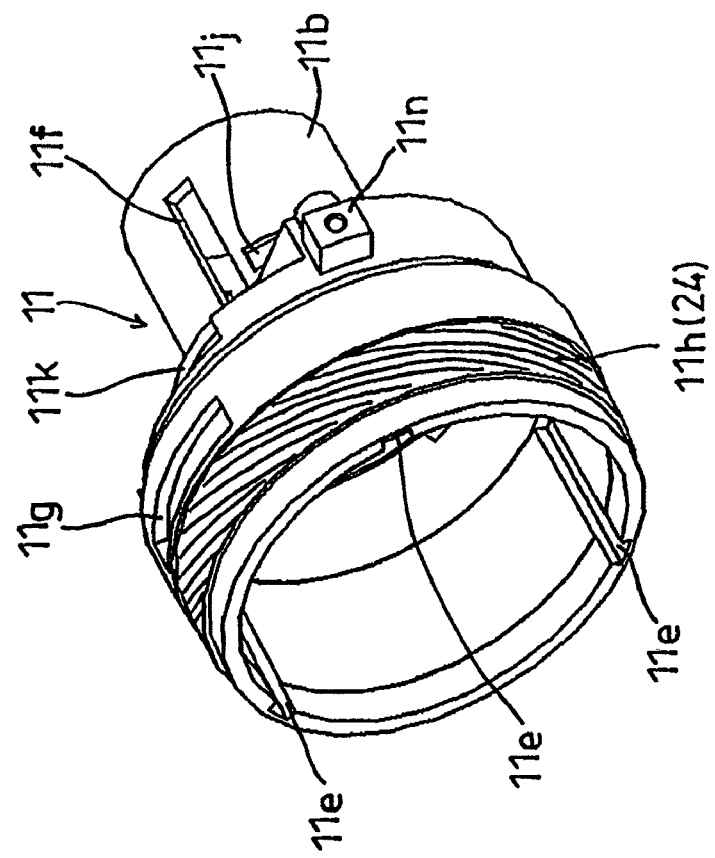
FIG. 7A is a front perspective view of a stationary frame.
Figure 7B:
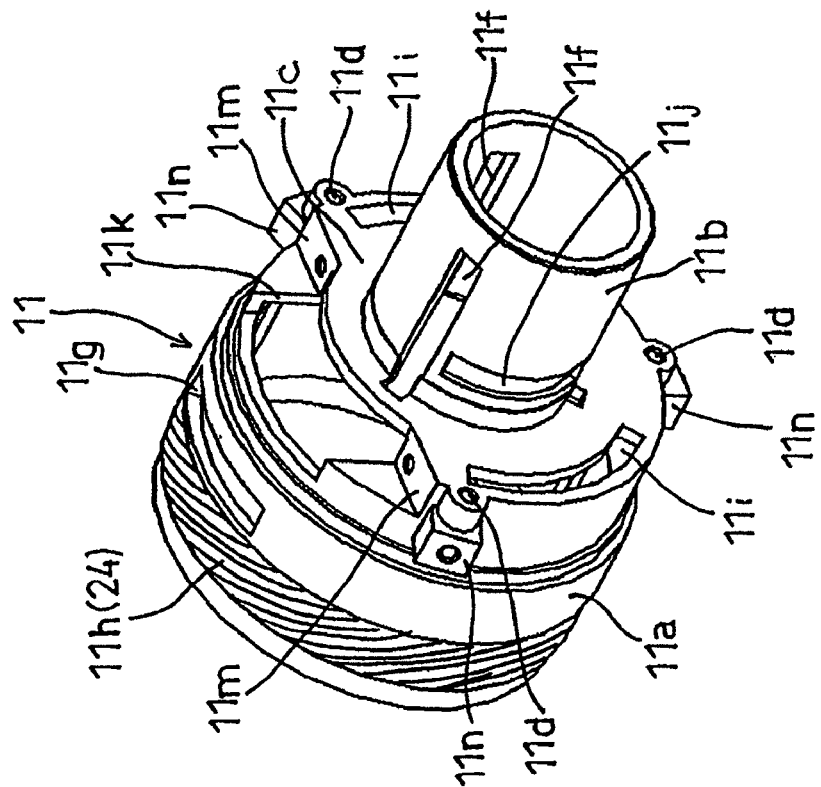
FIG. 7B is a rear perspective view of the stationary frame.

As shown in FIGS. 4, 7A and 7B, a stationary frame (linear guide ring) 11, which is an element of the variable power lens 10, is a cylindrical member having the central axis thereof lying on the optical axis O. The stationary frame 11 is provided, at the front and the rear thereof in the optical axis direction, with a large-diameter cylinder 11a and a small-diameter cylinder 11b, respectively, which are coaxial with each other. The small-diameter cylinder 11b is smaller in diameter than the large-diameter cylinder 11a. The stationary frame 11 is provided at the boundary between the large-diameter cylinder 11a and the small-diameter cylinder 11b with a middle flange 11c which is formed to extend radially to integrally connect the large-diameter cylinder 11a and the small-diameter cylinder 11b to each other. Three screw holes 11d are formed in the middle flange 11c at different circumferential positions. A stationary relay ring 12 is fixed to the back of the middle flange 11c by three set screws 40 (only one of which is shown in FIG. 4) that are screwed into the three screw holes 11d, respectively.

As shown in FIGS. 8A, 8B, 19 and 20, the stationary relay ring 12 is provided with a front flange 12a and a small-diameter cylinder 12b. The front flange 12a has three screw insertion holes (through-holes) 12c into which three set screws 40 are inserted, and the small-diameter cylinder 12b projects rearward from the front flange 12a to be positioned around the small-diameter portion 11b of the stationary frame 11. The small-diameter cylinder 12b is provided at the rear end thereof with three set screw seats 12d formed at different circumferential positions. A rear decorative ring 13 is fixed to the back of the stationary relay ring 12 by three set screws 41 (only one of which is shown in FIG. 4) that are screwed into three screw holes formed in the three set screw seats 12d, respectively.

Figure 3:
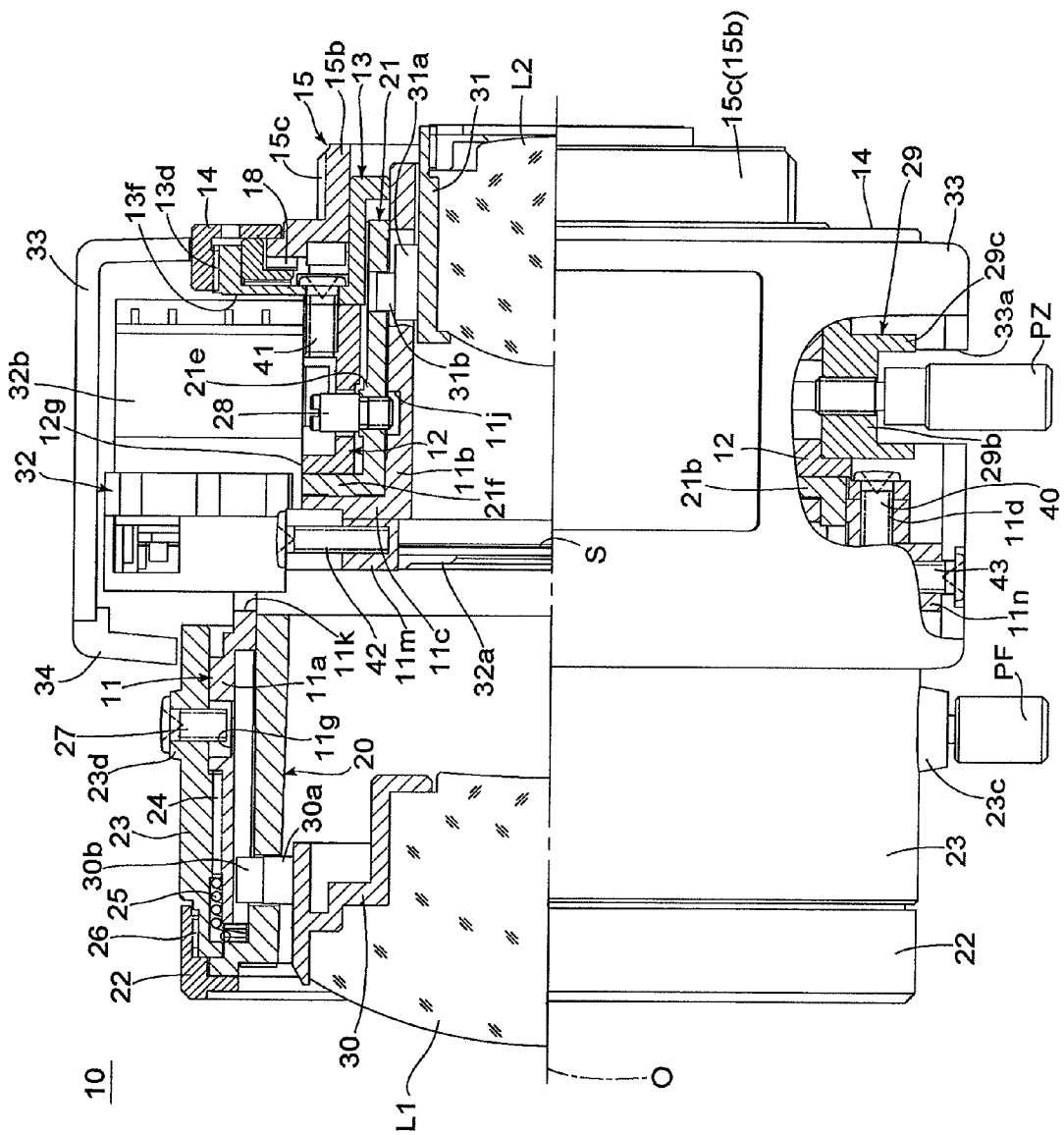
FIG. 3 is a side elevational view, partly in cross section and partly cutaway, of the variable power lens, wherein upper and lower halves of the lens are shown fully and partly in cross section, respectively.

As shown in FIGS. 9A and 9B, the rear decorative ring 13 is provided with a front flange 13a and a small-diameter cylinder 13b. The front flange 13a has three screw insertion holes (through-holes) 13c into which the three set screws 41 are inserted, and the small-diameter cylinder 13b projects rearward from the front flange 13a to be positioned around the small-diameter cylinder 11b of the stationary frame 11. The front flange 13a has a male thread 13d formed on the outer peripheral surface thereof, and a mount fixing ring 14 is screwed onto the male thread 13d as shown in FIGS. 3 and 4. A mount ring 15 is fitted on an outer peripheral surface of the small-diameter cylinder 13b and is supported thereby to be rotatable relative to the small-diameter cylinder 13b. The mount ring 15, together with an adjustment washer 16, a mount space ring 17 and a mount spring 18, is sandwiched and held between the front flange 13a and the mount fixing ring 14 and pressed rearward against the mount fixing ring 14 by the biasing force of the mount spring 18. In a state where no particular external force is applied to the variable power lens 10, the angular position of the mount ring 15 relative to the rear decorative ring 13 is maintained constant by friction obtained from the pressing force (biasing force) of the mount spring 18, and manually rotating the variable power lens 10 while applying a force in the optical axis direction so as to reduce the biasing force of the mount spring 18 makes relative rotation between the rear decorative ring 13 and the mount ring 15 about the optical axis O possible (i.e., makes it possible to adjust the angular position of the rear decorative ring 13 relative to the mount ring 15 about the optical axis O). The variable power lens 10 is provided between the rear decorative ring 13 and the mount ring 15 with a rotation limit projection 13e and a rotation limit projection 15a, respectively, for limiting the maximum angle of rotation of the mount ring 15.

Figure 1:
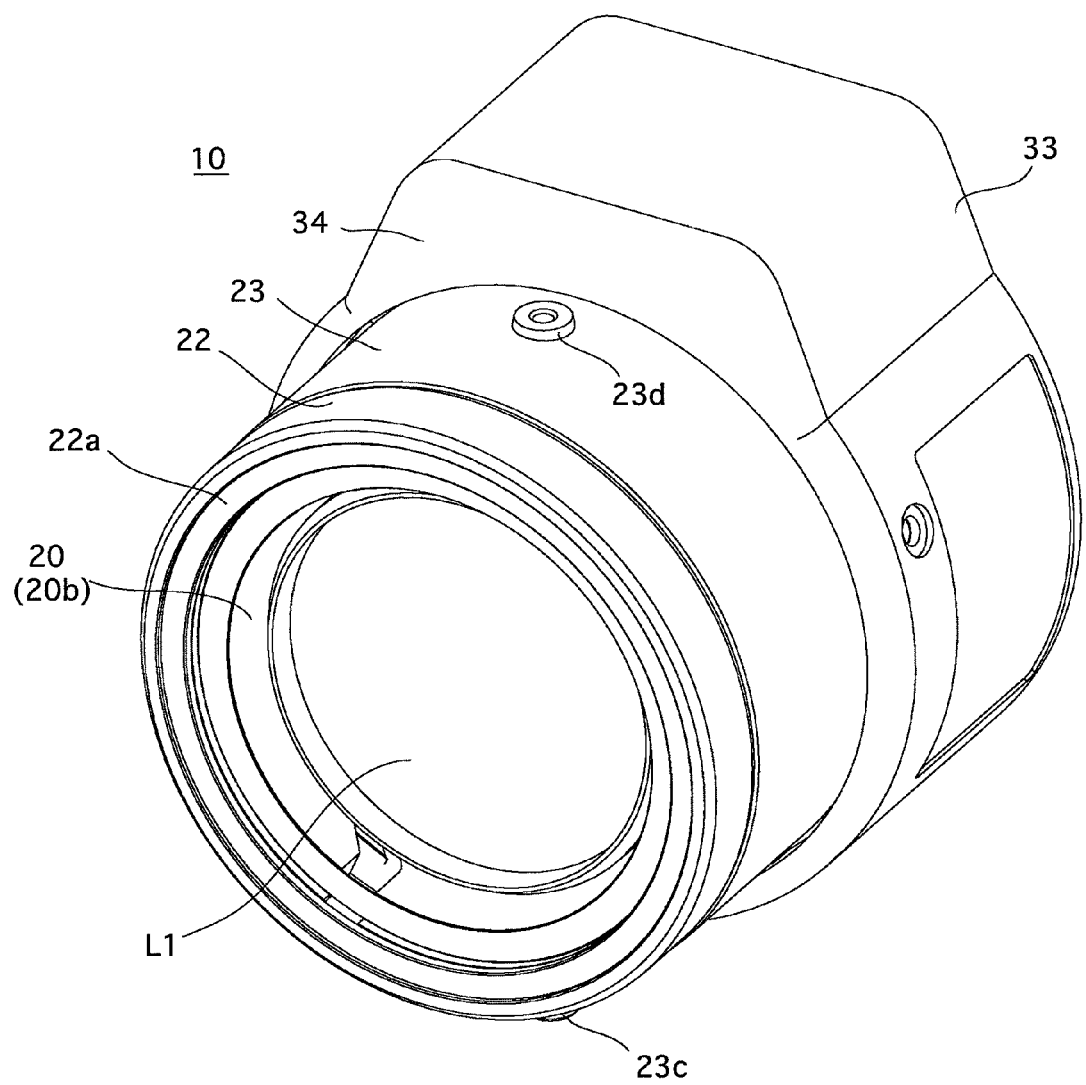
FIG. 1 is a front perspective view of a variable power lens according to the present invention.
Figure 2:
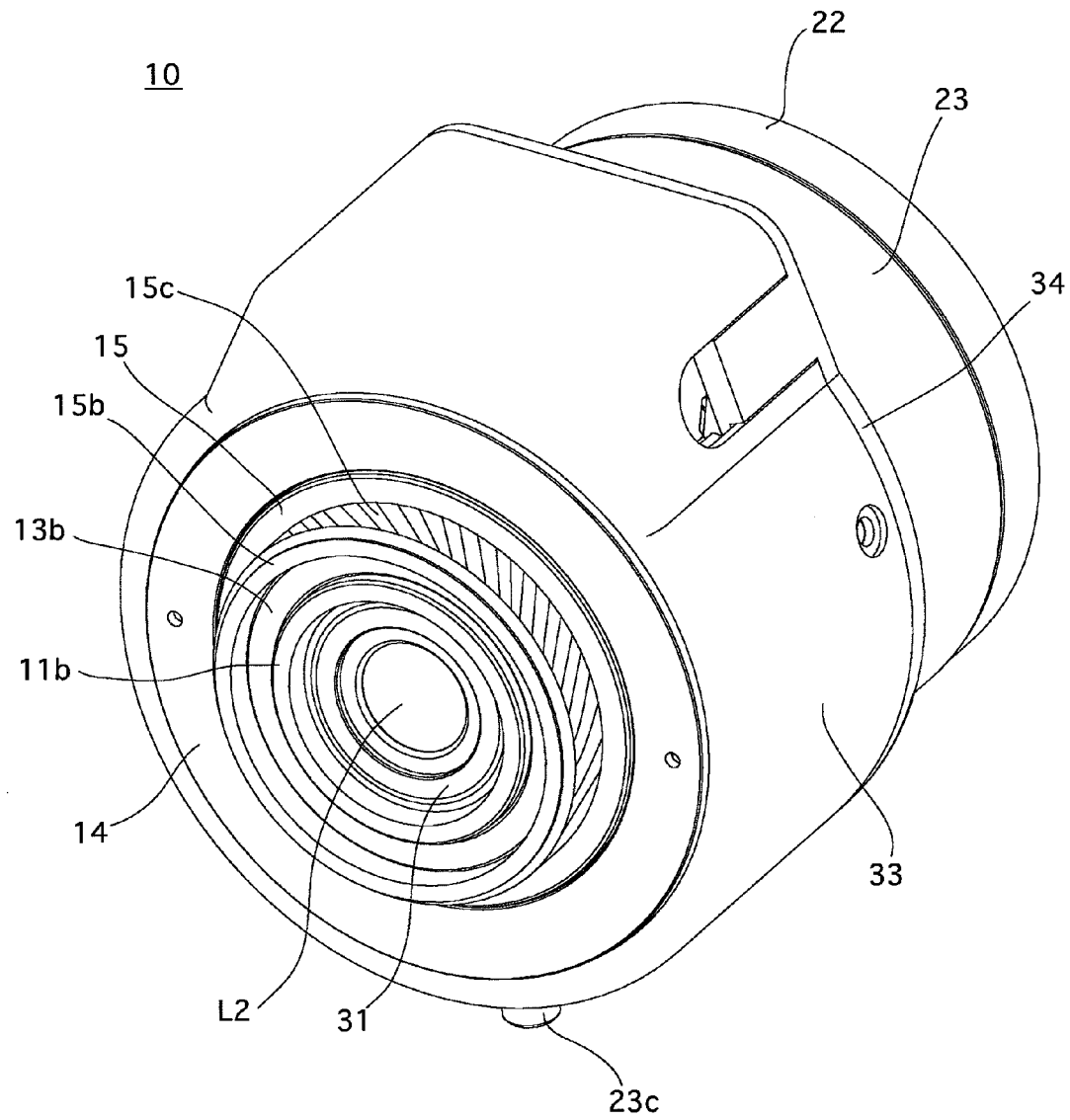
FIG. 2 is a rear perspective view of the variable power lens shown in FIG. 1.

As shown in FIGS. 2 and 4, the mount ring 15 is provided with a cylinder 15b which projects rearward, and is provided on an outer peripheral surface of the cylinder 15b with a mounting screw (male thread) 15c. The variable power lens 10 can be mounted to a camera body (not shown) by screw-engaging the mounting screw 15c with a female thread (not shown) formed on a body mount on the camera body. Accordingly, the elements from the mount ring 15 to the stationary frame 11 via the rear decorative ring 13 and the stationary relay ring 12 are fixedly supported by the camera body, and these elements except the mount ring 15 can change their installation angles relative to the mount ring 15 only when the above described angle adjustment operation is performed.

The variable power lens 10 is provided with a front cam ring (first lens group drive ring/front lens group drive ring) 20 which operates to control movement of the front lens group L1 in the optical axis direction, and a rear cam ring (second lens group drive ring/rear lens group drive ring) 21 which operates to control movement of the rear lens group L2 in the optical axis direction; in addition, the front cam ring 20 and the rear cam ring 21 are rotated as one body with no variation in relative position therebetween in the optical axis direction when a power varying operation is carried out, while the front cam ring 20 is solely moved in the optical axis direction without the rear cam ring 21 being moved when a focusing operation is carried out, which is a feature of the variable power lens 10.

As shown in FIGS. 7A and 7B, the large-diameter cylinder 11a and the small-diameter cylinder 11b of the stationary frame 11 are provided with three linear guide grooves 11e and three linear guide grooves 11f, respectively, all of which extend in the optical axis direction. The three linear guide grooves 11e are bottomed grooves formed on the inner peripheral surface of the large-diameter cylinder 11a, and the three linear guide grooves 11f are through-grooves formed radially through the small-diameter cylinder 11b.

As shown in FIGS. 10A, 10B and 23 through 25, the front cam ring 20 is provided with a cylinder 20a and an annular front-end flange (an element of a focus-ring coupler/annular flange) 20b. The cylinder 20a is positioned inside the large-diameter cylinder 11a of the stationary frame 11 and supported thereby to be freely rotatable, and the front-end flange 20b is positioned at the front end of the cylinder 20a and projects radially outwards. Three front cam grooves (through-grooves) 20c for moving (controlling) the front lens group L1 are formed radially through the wall of the cylinder 20a. Each front cam groove 20c is provided at the front end thereof with an opening 20c-1 (for insertion/removable of an associated cam follower 30a) which is open at the front of the front-end flange 20b. In addition, the cylinder 20a is provided, at the rear end thereof at different circumferential positions, with a pair of rotation transmission grooves (elements of a drive ring coupler/key grooves) 20d. In the present embodiment, the pair of rotation transmission grooves 20d are arranged with an interval of approximately 145 degrees therebetween in the circumferential direction. The front cam ring 20 is provided at the rear end of the cylinder 20a with two rearward projecting portions 20e which project rearward, and the pair of rotation transmission grooves 20d are formed on the two rearward projecting portions 20e to be open at the rear ends of the two rearward projecting portions 20e, respectively. A rotation transmission groove 20d and an associated rear projecting portion 20e are shown diagrammatically in FIG. 24 to illustrate a cross sectional shape of the rotation transmission grooves 20d; however, the actual positions of formation of the pair of rotation transmission grooves 20d are located on the two rearward projecting portions 20e as shown by solid lines in FIG. 23.

Figure 18:
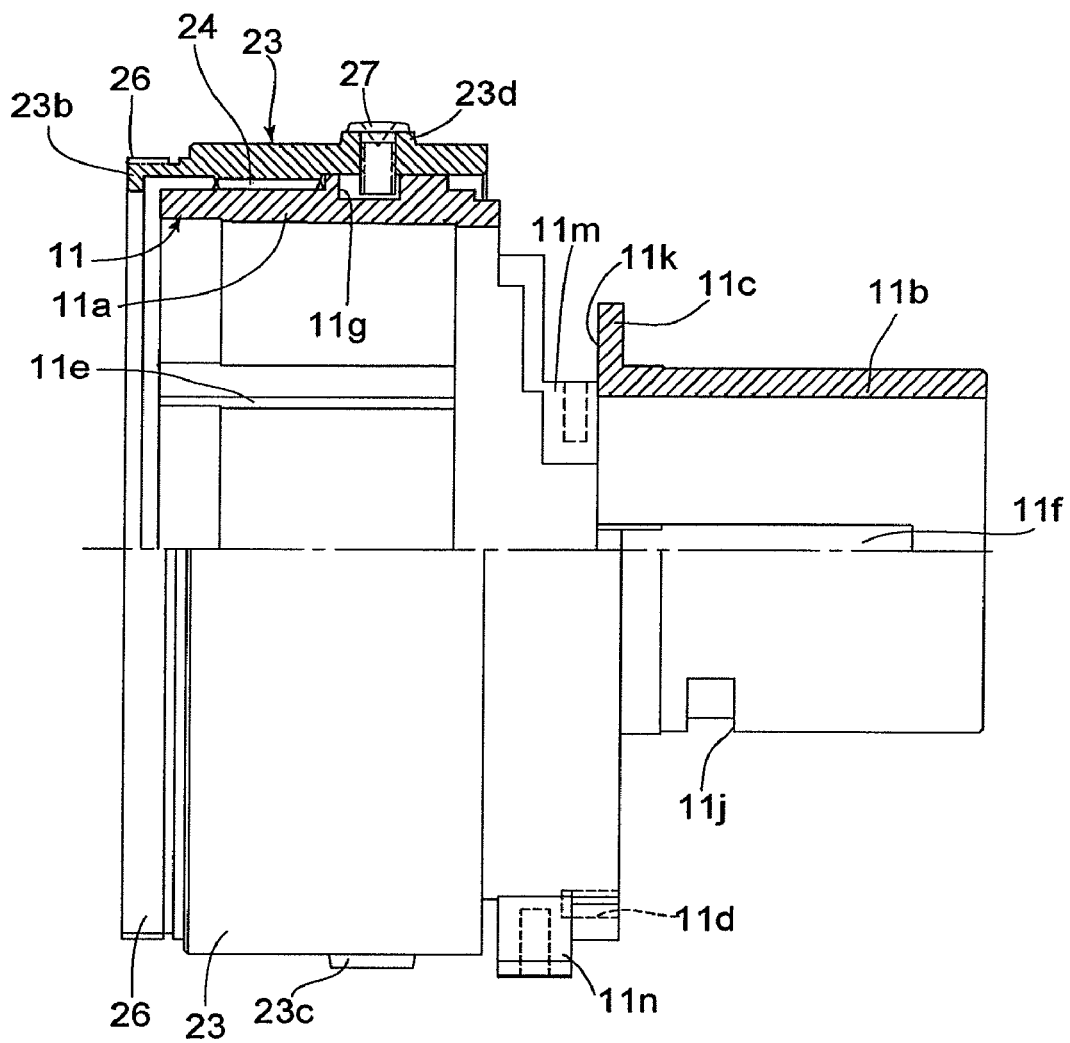
FIG. 18 is a side elevational view, partly in cross section, of the stationary frame and the focus ring, showing an upper half thereof in cross section taken along the D1-D1 line shown in FIG. 17.

As shown in FIGS. 4 and 18, a focus ring (an element of a focus operating member) 23 which is screw-mounted on the outer periphery of the large-diameter cylinder 11a of the stationary frame 11 via a focusing helicoid 24. More specifically, the focusing helicoid 24 consists of an outer surface helicoid (male helicoid) 11h (see FIGS. 7A and 7B) formed on an outer peripheral surface of the large-diameter cylinder 11a and an inner surface helicoid (female helicoid) 23a (see FIGS. 12A and 12B) formed on an inner peripheral surface of the focus ring 23. A focus-ring retaining ring (an element of the focus ring coupler/retaining ring) 22 is screw-mounted on an outer peripheral surface of the focus ring 23 at the front end thereof via a fine-pitch screw thread 26, and the front-end flange 20b of the front cam ring 20 is sandwiched between a radially inner flange 22a formed on the focus-ring retaining ring 22 and a front-end flange 23b formed at the front end of the focus ring 23. Accordingly, the front cam ring 20 has been integrated with the focus ring 23 in the optical axis direction via the focus-ring retaining ring 22; however, the front-end flange 20b of the front cam ring 20 is allowed to rotate about the optical axis O relative to the radially inner flange 22a of the focus-ring retaining ring 22 and the front-end flange 23b of the focus ring 23.

Figure 29:
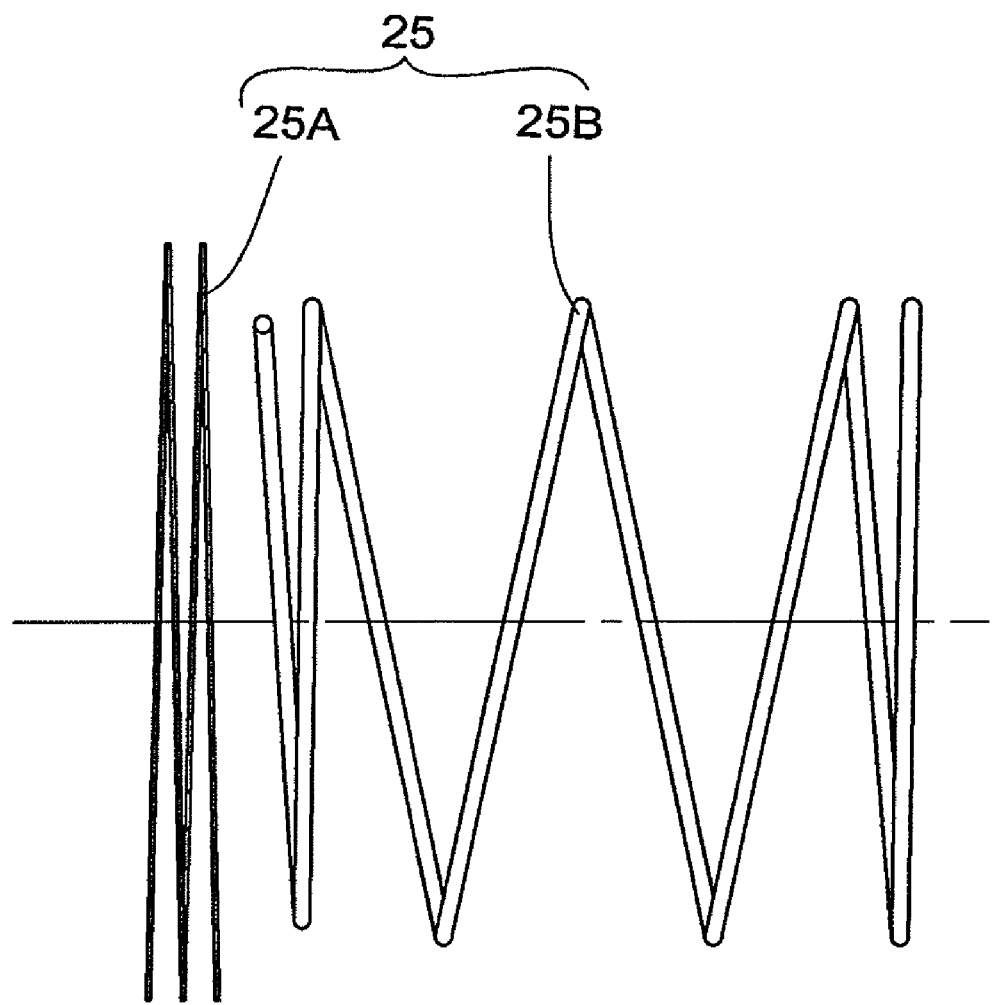
FIG. 29 is a side elevational view of a front-cam-ring biasing spring set that includes a spring washer and a compression coil spring.
Figure 30:
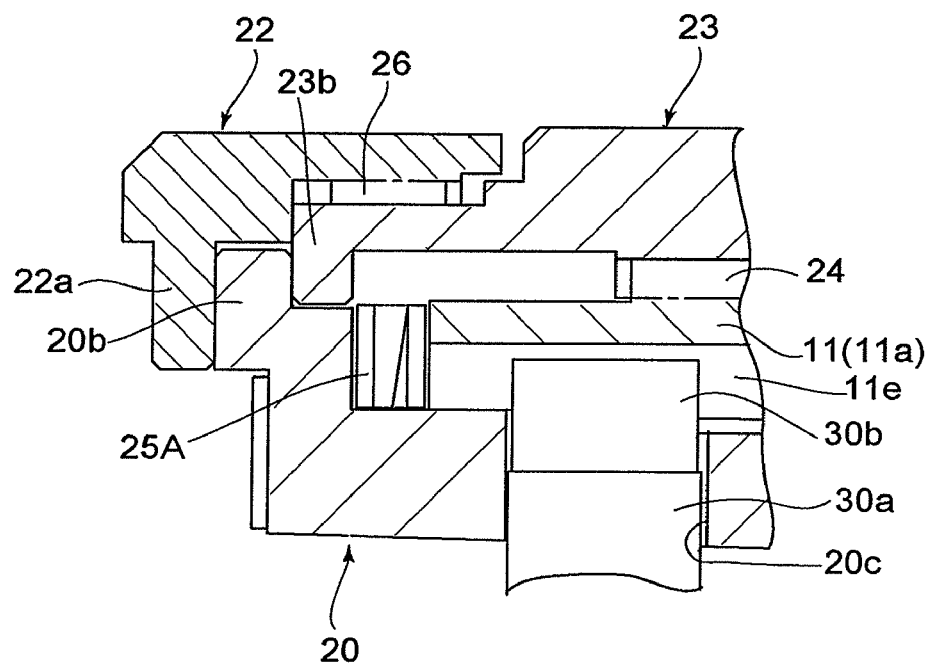
FIG. 30 is a cross sectional view of a main part of the variable power lens shown in FIGS. 1 through 4, showing a state where only the spring washer among the spring elements of the front-cam-ring biasing spring set is installed in the lens.
Figure 31:
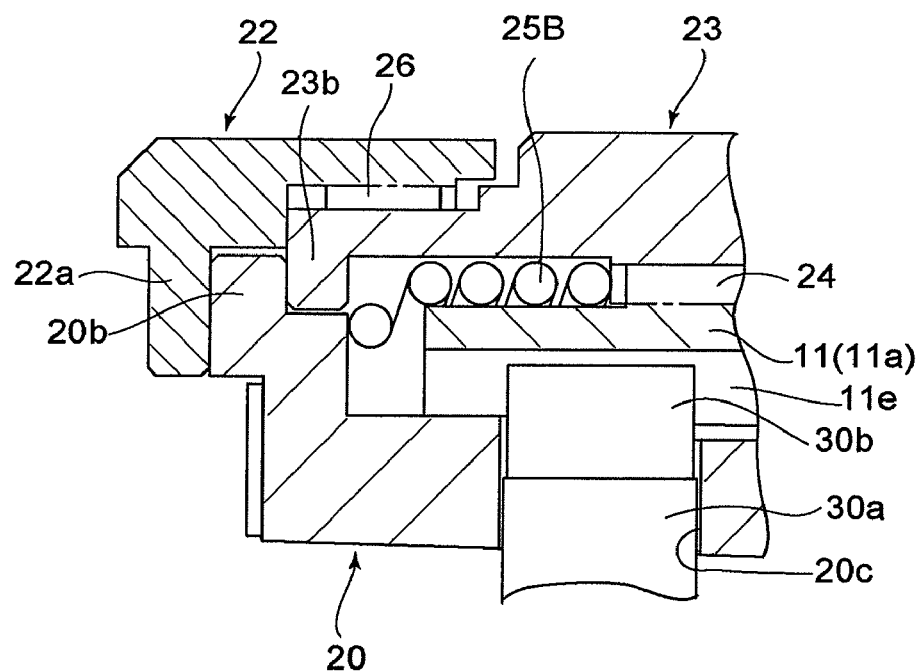
FIG. 31 is a cross sectional view of a main part of the variable power lens shown in FIGS. 1 through 4, showing a state where only the compression coil spring among the spring elements of the front-cam-ring biasing spring set is installed in the lens.

The front-end flange 20b of the front cam ring 20 is biased in a direction to be pressed against the radially inner flange 22a of the focus-ring retaining ring 22 by a front-cam-ring biasing spring (an element of the focus ring coupler/biaser) 25. As shown in FIGS. 29 and 30, the front-cam-ring biasing spring 25 consists of a spring washer 25A and a compression coil spring 25B. The spring washer 25A is inserted in between the front end of the large-diameter cylinder 11a of the stationary frame 11 and the front-end flange 20b of the front cam ring 20, and the compression coil spring 25B is inserted in between the focusing helicoid 24 (provided between the stationary frame 11 and the focus ring 23) and the front-end flange 20b of the front cam ring 20. Due to the biasing force of the front-cam-ring biasing spring 25, friction having a predetermined magnitude acts between the front cam ring 20 and the focus-ring retaining ring 22 (and the focus ring 23). By providing the front-cam-ring biasing spring 25 as a combination of the spring washer 25A and the compression coil spring 25B, fluctuations in rotational torque between the front cam ring 20 and the focus-ring retaining ring 22 can be reduced even if variations in clearance between the front cam ring 20 and the stationary frame 11 (i.e., the amount of movement of the front cam ring 20 relative to the stationary frame 11 in the optical axis direction) are large.

A focus ring coupler including the annular front-end flange 20b, the radially inner flange 22a, the front-end flange 23b and the front-cam-ring biasing spring 25, together with the focusing helicoid 24 constitute a focusing operation mechanism of the drive-ring movement controller according to the first embodiment.

As shown in FIGS. 3, 12A, 12B, 17 and 18, the focus ring 23 is provided, on an outer peripheral surface thereof at substantially radially symmetrical positions, with a lever support seat 23c and a screw support seat 23d, respectively, each of which has a screw hole formed therethrough in a radial direction. The variable power lens 10 is provided with a focus lever (an element of the focus operating member) PF (see FIGS. 3 and 17), the threaded base end of which is screwed into the lever support seat 23c to be supported thereby so as to project radially outwards from the focus ring 23. A limit screw 27 is screwed into the screw support seat 23d to be supported thereby. The threaded shaft portion of the limit screw 27 projects radially inwards into the inside of the focus ring 23 and is screwed down until the head of the limit screw 27 comes in contact with the screw support seat 23d. The stationary frame 11 is provided on an outer peripheral surface of the large-diameter cylinder 11a with a bottomed circumferential groove 11g which allows the threaded shaft portion of the limit screw 27, thus projected radially inwards, to be inserted into the bottomed circumferential groove 11g.

Figure 17:
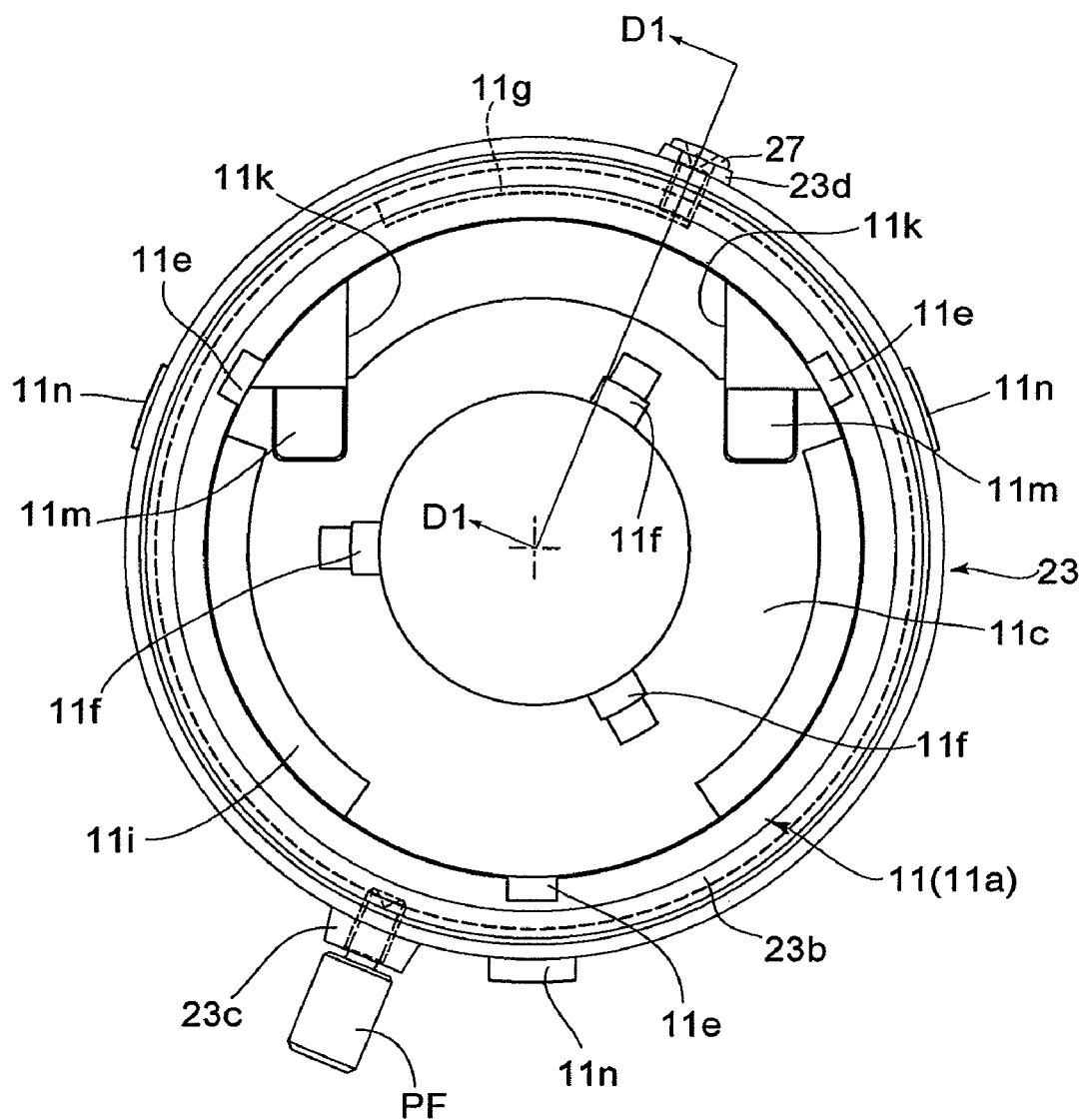
FIG. 17 is a front elevational view of the stationary frame and the focus ring which are engaged with each other with a focusing helicoid, which is formed on an inner peripheral surface of the focus ring, being screw-engaged with the stationary frame.
Figure 27:
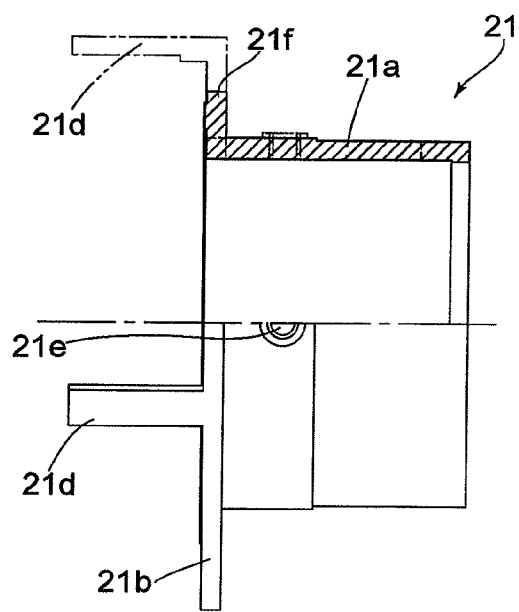
FIG. 27 is a side elevational view, partly in cross section, of the rear cam ring, showing an upper half thereof in cross section taken along the D5-D5 line shown in FIG. 26.

As shown in FIGS. 11A, 11B and 26 through 28, the rear cam ring 21 is provided with a cylinder 21a and a front-end flange 21b. The cylinder 21a is positioned outside the small-diameter cylinder 11b and supported thereby to be freely rotatable, and the front-end flange 21b is positioned at the front end of the cylinder 21a and projects radially outwards. Three rear cam grooves (through-grooves) 21c for moving the rear lens group L2 are formed in (through) the wall of the cylinder 21a. Each rear cam groove 21c is provided at the front end thereof with an opening 21c-1 which is open at the front of the front-end flange 21b. As shown in FIG. 4, the front-end flange 21b of the rear cam ring 21 is sandwiched between the middle flange 11c of the stationary frame 11 and the front flange 12a of the stationary relay ring 12, thereby the rear cam ring 21 being held at a constant position in the optical axis direction. In addition, the rear cam ring 21 is provided with a pair of rotation transmission keys (elements of the drive ring coupler) 21d which project forward from the front-end flange 21b in the optical axis direction. In the present embodiment, the pair of rotation transmission keys 21d are arranged with an interval of approximately 145 degrees therebetween in the circumferential direction to correspond to the pair of rotation transmission grooves 20d. As shown in FIGS. 7A, 7B and 17, two key insertion holes (through-holes) 11i, each having an arc shape about the optical axis O, are formed through the middle flange 11c of the stationary frame 11. The pair of rotation transmission keys 21d are extended forward into the internal space of the large-diameter cylinder 11a through the two key insertion holes 11i to be engaged in the pair of rotation transmission grooves 20d, respectively. One of the pair of rotation transmission keys 21d is shown diagrammatically in FIG. 27 as a cross sectional shape thereof, and the actual positions of formation of the pair of rotation transmission keys 21d are located on the front-end flange 21b shown by solid lines in FIG. 26. In FIG. 27, only one of the pair of rotation transmission keys 21d appears because it is superposed on the other as viewed in the direction perpendicular to the plane of FIG. 27.

The rear cam ring 21 is provided on an outer peripheral surface thereof with a pin support seat 21e having a screw hole formed in a radial direction. The threaded base end of a linkup pin 28 (see FIGS. 3 and 4) is screwed into the pin support seat 21e to be supported thereby. The linkup pin 28 projects radially outwards to the outside of the small-diameter cylinder 12b of the stationary relay ring 12 through a through-hole 12e which is formed through the small-diameter cylinder 12b and is elongated in the circumferential direction. The threaded base end of the linkup pin 28 projects radially inwards into the inside of the rear cam ring 21, and the stationary frame 11 is provided on an outer peripheral surface of the small-diameter cylinder 11b with a bottomed circumferential groove 11j which allows the threaded base end of the linkup pin 28, thus projected radially inwards, to be inserted into the circumferential groove 11j.

Figure 13B:
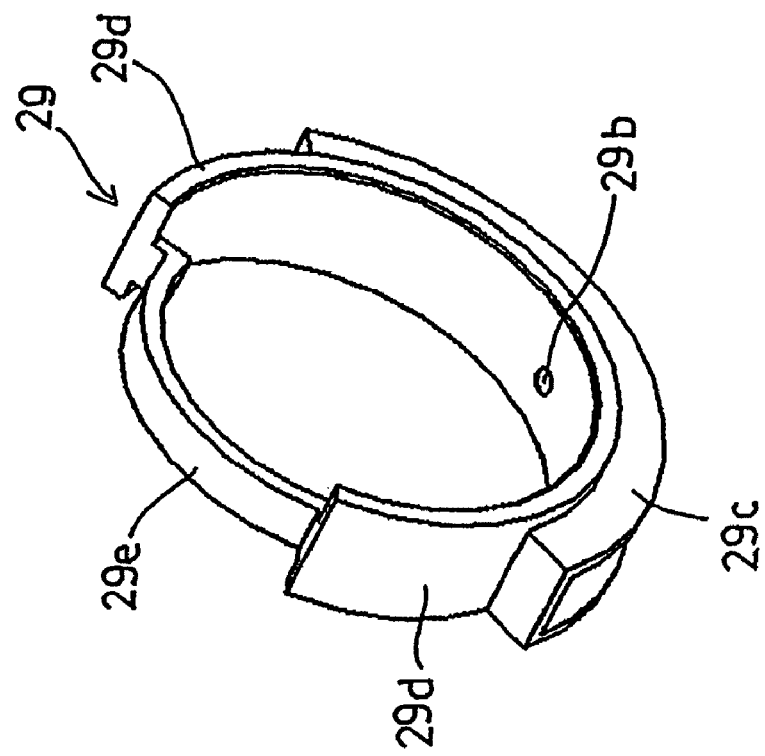
FIG. 13B is a rear perspective view of the power varying ring.
Figure 13A:
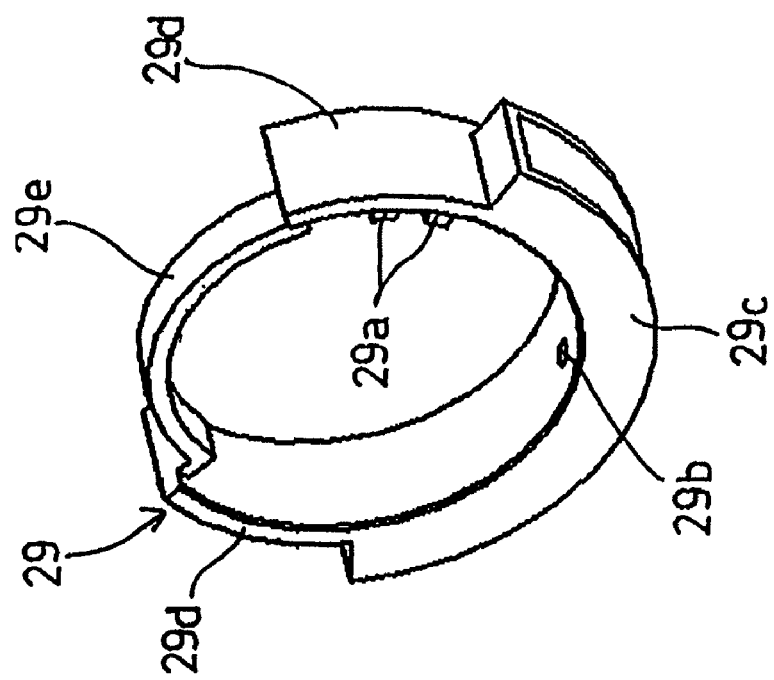
FIG. 13A is a front perspective view of a power varying ring.
Figure 19:
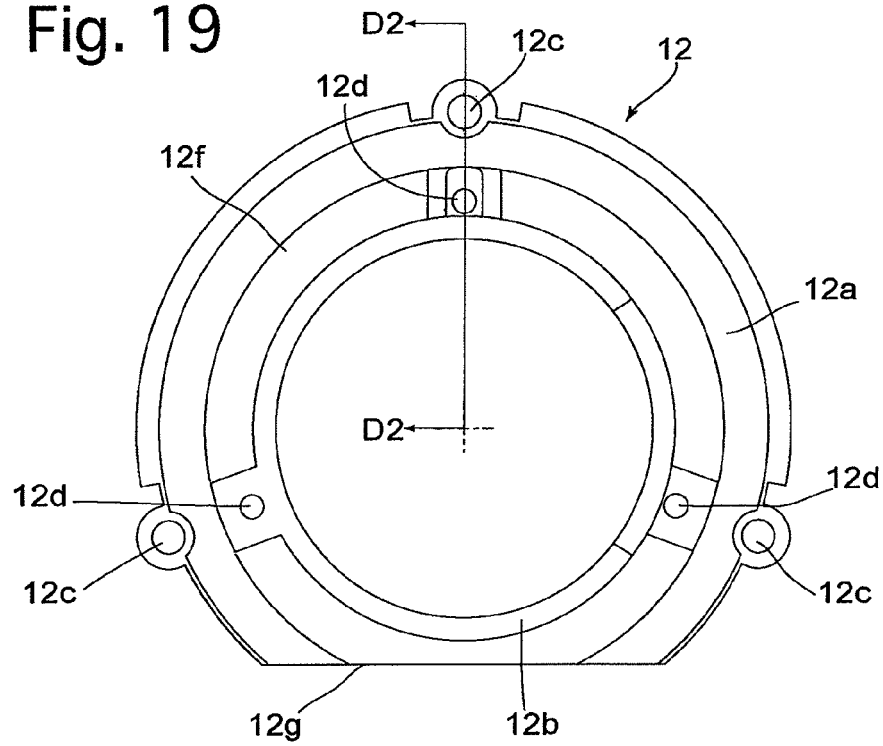
FIG. 19 is a rear elevational view of the stationary relay ring, viewed from rear in an optical axis direction.
Figure 20:
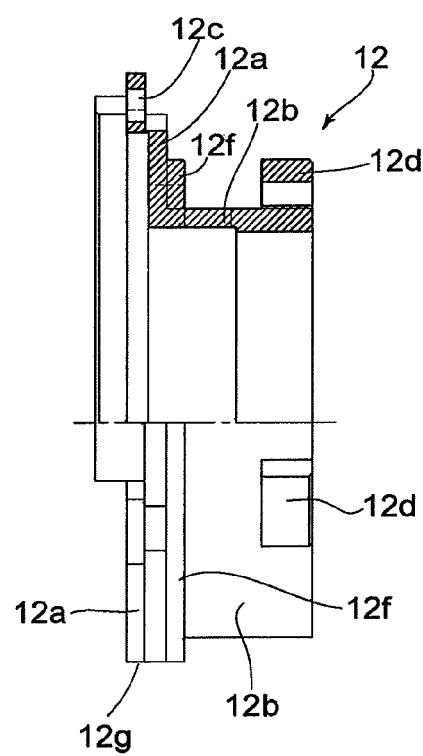
FIG. 20 is a side elevational view, partly in cross section, of the stationary relay ring, showing an upper half thereof in cross section taken along the D2-D2 line shown in FIG. 19.
Figure 21:
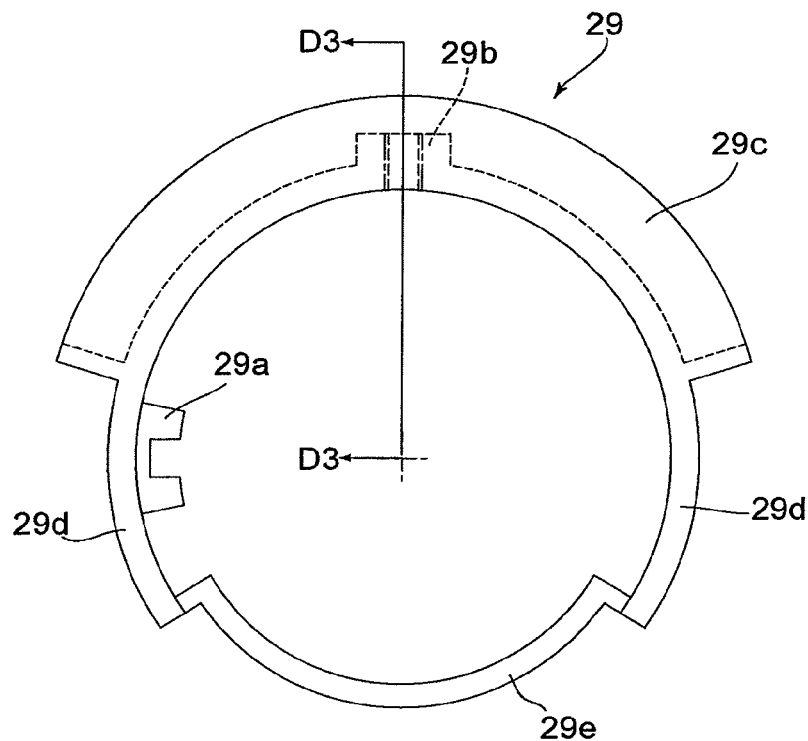
FIG. 21 is a rear elevational view of the power varying ring, viewed from rear in the optical axis direction.
Figure 22:
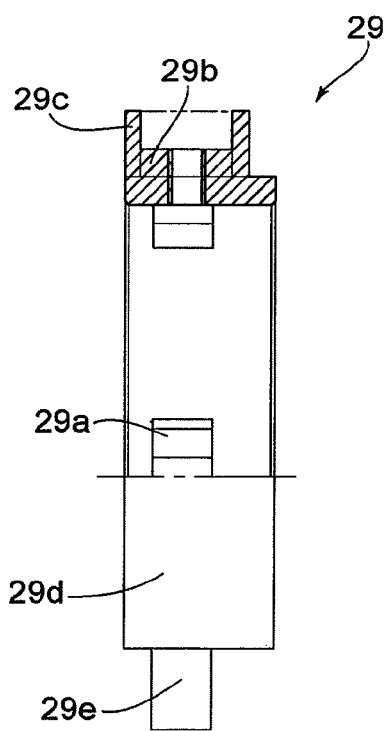
FIG. 22 is a side elevational view, partly in cross section, of the power varying ring, showing an upper half thereof in cross section taken along the D3-D3 line shown in FIG. 21.
Figure 23:
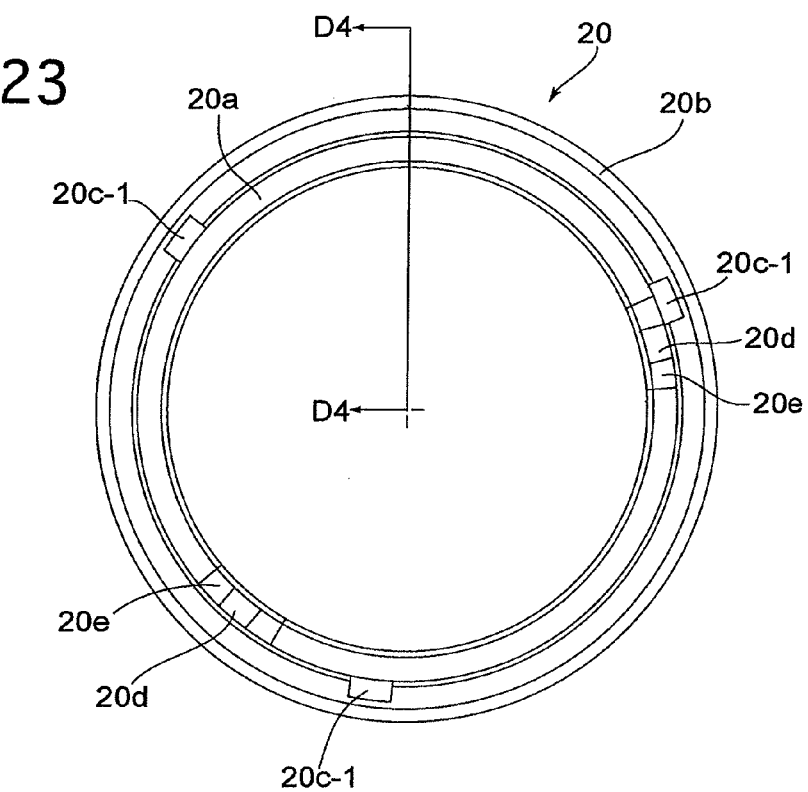
FIG. 23 is a rear elevational view of the front cam ring, viewed from rear in the optical axis direction.
Figure 24:
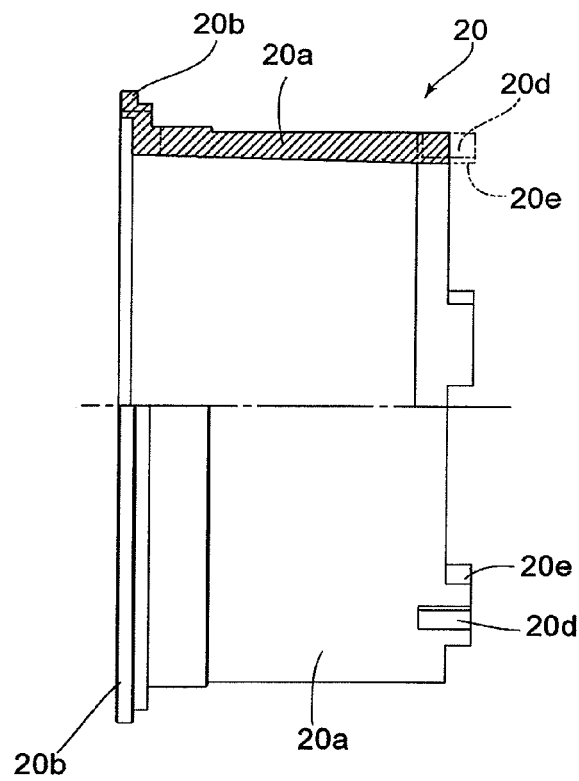
FIG. 24 is a side elevational view, partly in cross section, of the front cam ring, showing an upper half thereof in cross section taken along the D4-D4 line shown in FIG. 23.

The variable power lens 10 is provided around the stationary relay ring 12 with a power varying ring (an element of the power-variation operating member) 29 which is rotatable about the optical axis O and prevented from moving in the optical axis direction relative to the stationary relay ring 12. More specifically, as shown in FIGS. 19 and 20, the radially outer edges of the three set screw seats 12d which define outer peripheral surfaces thereof and the outer peripheral surface (radially outer edge) of a substantially annular support portion 12f formed on the back of the front flange 12a about the optical axis O are flush with each other on an imaginary cylindrical surface about the optical axis O, and the inner diameter portion (inner peripheral surface) of the power varying ring 29 is supported by the outer peripheral surfaces defined by the three set screw seats 12d and the peripheral surface of the substantially annular support portion 12f thereon to be rotatable relative thereto. As shown in FIGS. 13A, 21 and 22, the power varying ring 29 is provided on an inner peripheral surface thereof with a two-forked linkup projection 29a which holds the linkup pin 28 therebetween. Due to the engagement of the two-forked linkup projection 29a with the linkup pin 28, the power varying ring 29 and the rear cam ring 21 are integrated in the rotation direction (to be held so as to rotate together). The power varying ring 29 is provided on an inner peripheral surface thereof with a lever support seat 29b having a screw hole formed in a radial direction. The variable power lens 10 is provided with a power varying lever (an element of the power-variation operating member) PZ (see FIG. 3) the threaded base end of which is screwed into the lever support seat 29b to be supported thereby so as to project radially outwards from the power varying ring 29.

Figure 14:
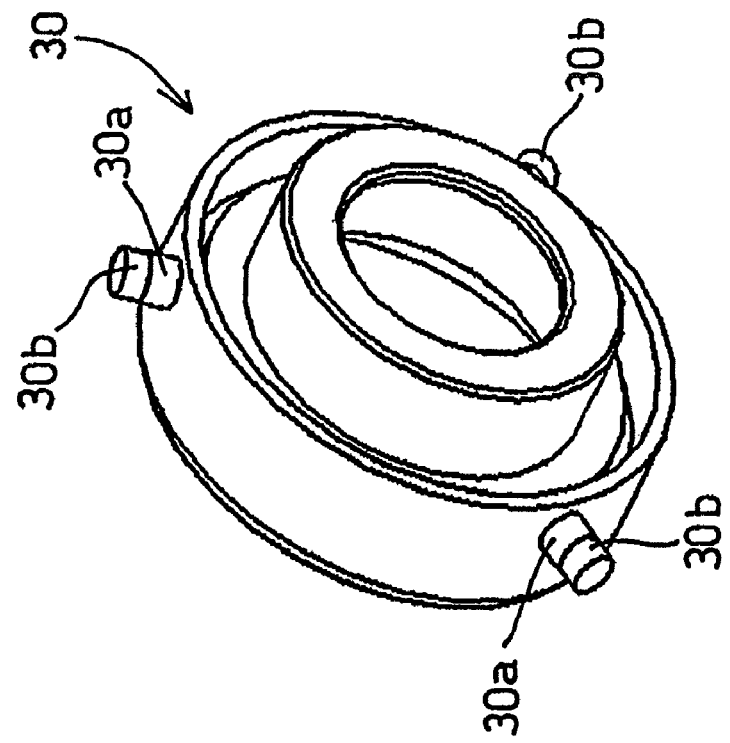
FIG. 14 is a rear perspective view of a front-lens-group support frame.

The variable power lens 10 is provided therein with a front-lens-group support frame (first lens group support frame) 30, and as shown in FIG. 14, holds the front lens group L1. The front-lens-group support frame 30 is provided with three cam follower projections 30a which project radially outwards from the outer periphery of the front-lens-group support frame 30, and is further provided with three linear guide projections 30b which project radially outwards from the radially outer ends of the three cam follower projections 30a, respectively. The three cam follower projections 30a and the three linear guide projections 30b are each shaped into a cylindrical (columnar) projection. The three cam follower projections 30a are slidably engaged in the three front cam grooves 20c of the front cam ring 20, respectively, and the three linear guide projections 30b are slidably engaged in the three linear guide grooves 11e of the stationary frame 11, respectively. Accordingly, the front-lens-group support frame 30 is guided linearly in the optical axis direction by the engagement between the three linear guide projections 30b and the three linear guide grooves 11e, and a rotation of the front cam ring 20 causes the front-lens-group support frame 30 to move in the optical axis direction due to the engagement between the three cam follower projections 30a and the three front cam grooves 20c.

Figure 15:
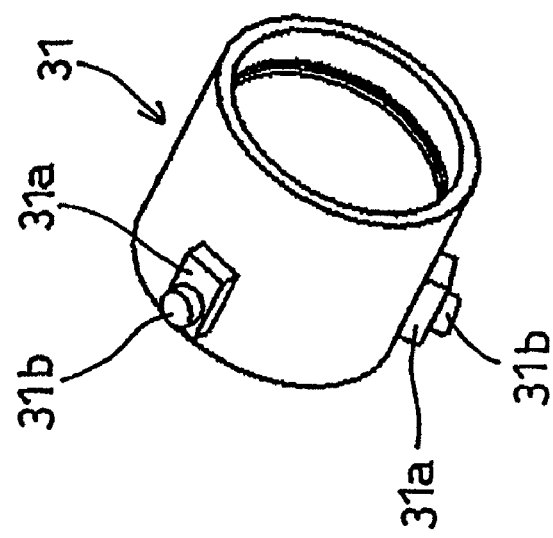
FIG. 15 is a rear perspective view of a rear-lens-group support frame.

The variable power lens 10 is provided therein with a rear-lens-group support frame (second lens group support frame) 31 which holds the rear lens group L2. As shown in FIG. 15, the rear-lens-group support frame 31 is provided with three square-cylindrical-shaped linear guide projections 31a which project radially outwards from the outer periphery of the rear-lens-group support frame 31, and is further provided with three cylindrical-shaped (columnar-shaped) cam follower projections 31b which project radially outwards from the radially outer ends of the three linear guide projections 31, respectively. The three linear guide projections 31a are slidably engaged in the three linear guide grooves 11f of the stationary frame 11, respectively, and the three cam follower projections 31b are slidably engaged in the three rear cam grooves 21c of the rear cam ring 21, respectively. Accordingly, the rear-lens-group support frame 31 is guided linearly in the optical axis direction by the engagement between the three linear guide projections 31a and the three linear guide grooves 11f, and a rotation of the rear cam ring 21 causes the rear-lens-group support frame 31 to move in the optical axis direction due to the engagement between three cam follower projections 31b and the three rear cam grooves 21c.

The front cam grooves 20c, the rear cam grooves 21c, the cam follower projections 30a, the cam follower projections 31b together with the drive ring coupler (the pair of rotation transmission grooves 20d and the pair of rotation transmission keys 21d) constitute a power-variation mechanism of the drive-ring movement controller.

Figure 16B:
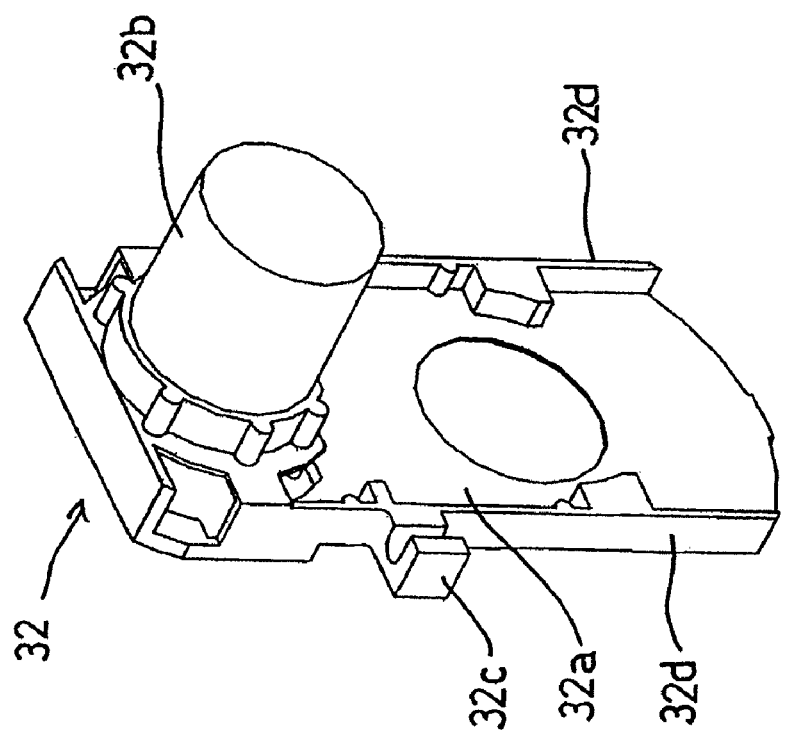
FIG. 16B is a rear perspective view of the auto iris unit.
Figure 16A:
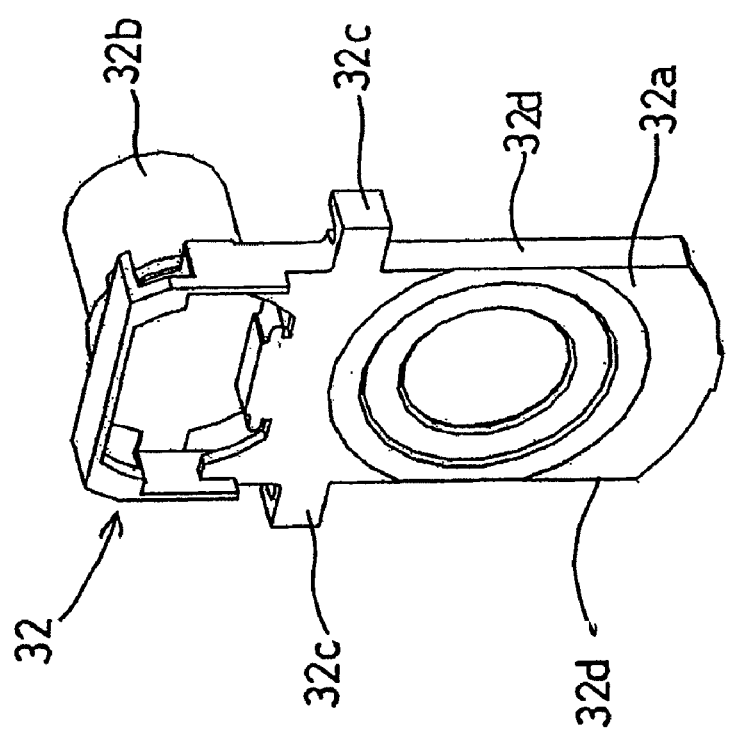
FIG. 16A is a front perspective view of an auto iris unit.

As shown in FIGS. 7A, 7B and 18, the stationary frame 11 is provided, at a position adjoining the front of the intermediate flange 11c, with an opening 11k which extends through the large-diameter cylinder 11a. The variable power lens 10 is provided therein with an auto iris unit (light-quantity controller) 32 which is inserted inside the stationary frame 11 through the opening 11k. The stationary frame 11 is provided in the vicinity of the opening 11k with a pair of screw seats 11m (see FIGS. 3, 7B, 17 and 18) each having a screw hole into which a set screw 42 (see FIG. 3) for fixing the auto iris unit 32 to the stationary frame 11 is screwed. As shown in FIGS. 16A and 16B, the auto iris unit 32 is provided with a diaphragm sector housing portion 32a, a motor housing portion 32b and a pair of side protrusions 32c. The diaphragm sector housing portion 32a has a thin box shape, contains diaphragm blades S and is inserted into the opening 11k. The motor housing portion 32b projects rearward from the diaphragm sector housing portion 32a and houses a motor for driving the diaphragm blades S. The pair of side protrusions 32c are supported by the pair of screw seats 11m of the stationary frame 11 thereon and allow the two set screws 42 to pass therethrough. The motor housing portion 32b has a cylindrical shape, the axis of which extends substantially parallel to the optical axis O. The edge (bottom edge with respect to FIGS. 16A and 16B) of the diaphragm sector housing portion 32a in the direction of insertion of the auto iris unit 32 into the opening 11k is in the shape of a circular arc that corresponds with an inner peripheral surface of the large-diameter cylinder 11a of the stationary frame 11, while the diaphragm sector housing portion 32a is provided, on opposite sides thereof in a direction orthogonal to the aforementioned insertion direction, with two straight D-cut portions 32d, respectively. The auto iris unit 32 is fixed to the stationary frame 11 by screwing the two set screws 42 into the pair of screw seats 11m, respectively, with the diaphragm sector housing portion 32a being inserted into the opening 11k and with the pair of side protrusions 32c being mounted on the pair of screw seats 11m.

Part of the variable power lens 10 from the mount fixing ring 14 to a portion in the vicinity of the base end (right end as viewed in FIGS. 3 and 4) of the focus ring 23 is covered by a rear cover 33 and a front cover 34. The stationary frame 11 is provided with a cover support seat 11n having a screw hole into which a set screw 43 (see FIG. 3) for fixing the rear cover 33 to the stationary frame 11 is screwed. The rear cover 33 is provided with a through-hole 33a (see FIG. 3) which allows the power varying lever PZ to project outwardly therethrough. The through-hole 33a is elongated in the circumferential direction.

Operations of the variable power lens 10 that has the above described structure will be discussed hereinafter. A power varying operation is carried out by manually turning the power varying lever PZ in the circumferential direction. Manually turning the power varying lever PZ causes the power varying ring 29 to rotate about the optical axis O. This rotation of the power varying ring 29 is transmitted to the rear cam ring 21, which is coupled to the power varying ring 29, via the engagement of the two-forked linkup projection 29a with the linkup pin 28. Subsequently, the rotation of the rear cam ring 21 about the optical axis O causes the rear support frame 31, which is guided linearly in the optical axis direction by the three linear guide grooves 11f of the stationary frame 11 and the linear guide projections 31a of the rear support frame 31, to move in the optical axis direction in a predetermined moving manner while being guided by the cam follower projections 31b of the rear support frame 31 and the three rear cam grooves 21c of the rear cam ring 21. In addition, the rotation of the rear cam ring 21 is transmitted to the front cam ring 20 via the engagement of the pair of rotation transmission keys 21d with the pair of rotation transmission grooves 20d, which causes also the front cam ring 20 to rotate about the optical axis O. Thereupon, the front-lens-group support frame 30, which is guided linearly in the optical axis direction by the three linear guide grooves 11e of the stationary frame 11 and the three linear guide projections 30b of the front-lens-group support frame 30, is moved in the optical axis direction in a predetermined moving manner with the three cam follower projections 30a being guided by the three front cam grooves 20c, respectively. During this movement of the front-lens-group support frame 30, the front-end flange 20b of the front cam ring 20 rotates relative to the radially inner flange 22a of the focus-ring retaining ring 22 and the front-end flange 23b of the focus ring 23 (slides therealong in a rotation direction), which are positioned on the opposite sides of the front-end flange 20b in the optical axis direction, while neither the focus-ring retaining ring 22 nor the focus ring 23 is rotated. Therefore, the focus ring 23 does not move in the optical axis direction via the focusing helicoid 24, and the front cam ring 20 rotates at a fixed position, i.e., without changing the position thereof in the optical axis direction. Accordingly, when a power varying operation is carried out, the front cam ring 20 and the rear cam ring 21 integrally rotate without moving relative to each other in the optical axis direction, thus functioning as a substantially single cam ring. During transmission of rotation from the front cam ring 20 to the rear cam ring 21 when a power varying operation is performed, the pair of rotation transmission keys 21d move in the two key insertion holes 11i, respectively, in the circumferential direction, which are formed through the stationary frame 11; the circumferential lengths of the key insertion holes 11i are predetermined so as not to limit movements of the pair of rotation transmission keys 21d over the entire power varying range from the shortest focal length side to the longest focal length side. The threaded base end of the linkup pin 28 projects radially inwards into the inside of the rear cam ring 21 through the pin support seat 21e, and the circumferential groove 11j is formed on an outer peripheral surface of the small-diameter cylinder 11b of the stationary frame 11. The circumferential groove 11j serves as a clearance groove for preventing the small-diameter cylinder 11b from interfering with the linkup pin 28, and the linkup pin 28 moves in the circumferential groove 11j in accordance with rotation of the power varying ring 29 when a power varying operation is performed.

A focusing operation is performed by manually turning the focus lever PF in the circumferential direction. Manually turning the focus lever PF causes the focus ring 23 to rotate about the optical axis O, and thus causing the focus ring 23 to change the position in the optical axis direction relative to the stationary frame 11 due to the screw engagement of the focusing helicoid 24 (i.e., the engagement between the outer surface helicoid 11*h* and the inner surface helicoid 23*a*). The focus-ring retaining ring 22, which is engaged with the focus ring 23 via the fine-pitch screw thread 26, also changes the position in the optical axis direction while rotating with the focus ring 23. Thereupon, the front cam ring 20, the front-end flange 20*b* of which is held between the front-end flange 23*b* of the focus ring 23 and the radially inner flange 22*a* of the focus-ring retaining ring 22, changes the position in the optical axis direction together with the focus ring 23 and the focus-ring retaining ring 22, and the front-lens-group support frame 30, which is supported by the front cam ring 20 therein, is moved with the front cam ring 20 in the optical axis direction. During this movement of the front-lens-group support frame 30, the radially inner flange 22*a* of the focus-ring retaining ring 22 and the front-end flange 23*b* of the focus ring 23 rotate relative to the front-end flange 20*b* of the front cam ring 20 (slides thereon in a rotation direction), so that the front cam ring 20 is not rotated. Therefore, the three cam follower projections 30*a* do not move in the three front cam grooves 20*c* of the front cam ring 20, so that the front cam ring 20 and the front-lens-group support frame 30 are in a substantially integrated state. Accordingly, when a focusing operation is carried out, the front cam ring 20 and the front-lens-group support frame 30 integrally move in the optical axis direction without changing the relative position therebetween in either the optical axis direction or the rotation direction, thus functioning as a substantially single advancing/retracting member. In other words, the front cam ring 20 that is for power variation control also serves as an advancing/retracting member for focusing. The threaded shaft portion of the limit screw 27 that projects radially inwards into the inside of the focus ring 23 through the screw support seat 23*d* moves in the bottomed circumferential groove 11*g* of the stationary frame 11 in accordance with rotation of the focus ring 23 when a focusing operation is performed. The bottomed circumferential groove 11*g* is both elongated in the circumferential direction and widened in the optical axis direction so as not to interfere with the limit screw 27, which changes the position thereof in the optical axis direction while rotating with the focus ring 23. In addition, the maximum angle of rotation of the focus ring 23 relative to the stationary frame 11 is limited by the engagement of the limit screw 27 with one end and the other end of the circumferential groove 11*g* in the circumferential direction.

In this focusing operation, a focusing adjustment operation is carried out so as also to adjust a variation in position of a focal plane which is caused by a power varying operation. Accordingly, since a focusing operation is carried out by taking a focus adjustment amount required to compensate the variation in position of the focal plane into account, no extra adjustment mechanism or operation for the positional variation of the focal plane caused by a power varying operation is required.

As described above, in the present embodiment of the variable power lens 10, a power varying operation is carried out by integrally rotating the front cam ring 20 and the rear cam ring 21 without moving the front cam ring 20 and the rear cam ring 21 relative to each other in the optical axis direction in accordance with an operation of the power varying lever PZ that is installed on the power varying ring 29, and a focusing operation is carried out by integrally moving the front cam ring 20 and the front-lens-group support frame 30 in the optical axis direction, without moving the rear cam ring 21, in accordance with an operation of the focus lever PF that is installed on the focus ring 23. In the variable power lens 10, the auto iris unit 32 is provided at a midpoint between the front lens group L1 and the rear lens group L2. As can be seen from FIG. 3, the diaphragm sector housing portion 32*a* of the auto iris unit 32 partitions the internal space of the stationary frame 11 into two spaces on the large-diameter cylinder 11*a* side and the small-diameter cylinder 11*b* side, respectively. In addition, an internal space of the stationary frame 11 which extends through the boundary between the large-diameter cylinder 11*a* and the small-diameter cylinder 11*b* in the forward/rearward direction (i.e., the optical axis direction) can be obtained only in each of the two areas (side spaces/insertion spaces) defined by the two D-cut portions 32*d*, respectively, that are formed on opposite sides of the diaphragm sector housing portion 32*a*. Under such conditions, a cam ring having a completely annular shape which extends over the range from the large-diameter cylinder 11*a* to the small-diameter cylinder 11*b*, which support the front lens group L1 and the rear lens group L2, respectively, cannot be installed in the variable power lens 10. If this kind of completely-annular cam ring were to be installed, measures including increasing the inner diameter of the stationary frame 11 would be required. This causes an increase in size of the lens barrel and production cost, which is undesirable.

In contrast, in the present embodiment of the variable power lens, the above described structure in which the front cam ring 20 and the rear cam ring 21 (which are for driving the front lens group L1 and the rear lens group L2, respectively) are provided as separate elements and in which the front cam ring 20 and the rear cam ring 21 are coupled to each other by the pair of rotation transmission grooves 20*d* and the pair of rotation transmission keys 21*d* makes it possible to link the front cam ring 20 and the rear cam ring 21 with each other by manually rotating the power varying lever PZ (the power varying ring 29) as an independent power-variation operating member when a power varying operation is carried out even under the condition of being subject to restrictions caused by installation space for the auto iris unit 32 that is installed at a midposition between the front lens group L1 and the rear lens group L2, which makes it possible to achieve miniaturization in structure without spoiling operability. More specifically, the pair of rotation transmission keys 21*d* that are formed on the rear cam ring 21 are extended forward (into the internal space of the large-diameter cylinder 11*a*) through the two side spaces (insertion spaces) which are defined by an inner peripheral surface of the large-diameter cylinder 11*a* and the two D-cut portions 32*d*, respectively, and these two side spaces that are respectively occupied by the pair of rotation transmission keys 21*d* are far smaller than the space which would otherwise be required for a completely-annular cam ring. Accordingly, it possible to prevent the pair of rotation transmission keys 21*d* from interfering with the auto iris unit 32 that has such a shape as to divide the stationary frame 11 into front and rear parts.

In addition, the variable power lens 10 adopts a newly developed structure in which, when a focusing operation is performed, the front cam ring 20 itself is moved with the front-lens-group support frame 30 in the optical axis direction by manually rotating the focus lever PF (the focus ring 23) that serves as a focus operating member. During this movement, the coupling structure which couples the front cam ring 20 and the rear cam ring 21 to each other by the pair of rotation transmission grooves 20*d* and the pair of rotation transmission keys 21*d* allows the front cam ring 20 and the rear cam ring 21 to move relative to each other in the optical axis direction while preventing the front cam ring 20 and the rear cam ring 21 from relatively rotating with respect to each other, which contributes to an achievement of a focusing mechanism using the front cam ring 20 itself as an advancing/retracting member which advances and retracts in the optical axis direction.

As described above, in the present embodiment of the variable power lens 10, the pair of rotation transmission keys 21d are formed on the rear cam ring 21 to correspond to the two side spaces obtained by the formation of the two straight D-cut portions 32d that are provided on opposite sides of the diaphragm sector housing portion 32a. This structure achieves a reliable transmission of rotational force between the front cam ring 20 and the rear cam ring 21 and also achieves a space-saving arrangement. However, a single coupling portion for coupling the front and rear cam rings, which corresponds to a combination of the pair of rotation transmission grooves 20d and the pair of rotation transmission keys 21d, can be provided if a sufficient coupling strength can be secured. Alternatively, in the case where there is enough installation space, it is possible to provide the variable power lens 10 with three or more coupling portions for coupling the front and rear cam rings to each other, each of such coupling portions corresponding to the combination of the pair of rotation transmission grooves 20d and the pair of rotation transmission keys 21d.

In the variable power lens 10, the prevention of interference of the motor housing portion 32b of the auto iris unit 32 with other elements is taken into consideration. The stationary relay ring 12, the rear decorative ring 13, the rear cam ring 21 and the power varying ring 29 are positioned behind the motor housing portion 32b of the auto iris unit 32 in the optical axis direction, i.e., in the direction of projection of the motor housing portion 32b. As shown in FIGS. 8A, 8B, 19 and 20, the stationary relay ring 12 is provided with a D-cut portion 12g which is formed so as to partly cut off the front flange 12a and the annular support portion 12f. As shown in FIGS. 11A, 11B, 26 and 27, the rear cam ring 21 is provided, at the front end thereof (ignoring the pair of rotation transmission keys 21d), with a small-diameter flange 21f which is formed to lie in a plane in which the front flange 21b lies. The small-diameter flange 21f is smaller in outer diameter than the front flange 21b. The D-cut portion 12g and the small-diameter flange 21f are positioned to correspond to the position of the motor housing portion 32b of the auto iris unit 32 in the circumferential direction (see FIG. 3), so that the flange 12a of the stationary relay ring 12 and the front flange 21b of the rear cam ring 21 are prevented from interfering with the motor housing portion 32b. In addition, as shown in FIGS. 3 and 9A, the rear decorative ring 13 is provided on a front surface of the front flange 13a with a front recessed portion 13f which allows the rear end of the motor housing portion 32b to enter to prevent the rear decorative ring 13 from interfering with the motor housing portion 32b.

In addition, as shown in FIGS. 13A, 13B, 21 and 22, the outer diameter of the power varying ring 29 differs in a stepwise manner so as to define three different diameters. More specifically, the power varying ring 29 is provided with a large-diameter circumferential portion 29c, a pair of intermediate circumferential portions 29d, and a small-diameter circumferential portion 29e. The large-diameter circumferential portion 29c includes the lever support seat 29b for the power varying lever PZ. The pair of intermediate circumferential portions 29d are positioned at the circumferentially opposite ends of the large-diameter circumferential portion 29c, respectively, and are smaller in outer diameter than the large-diameter circumferential portion 29c. The small-diameter circumferential portion 29e is positioned between the pair of intermediate circumferential portions 29d and has the smallest outer diameter. The small-diameter circumferential portion 29e is substantially identical in outer diameter to the small-diameter flange 21f of the rear cam ring 21, and the power varying ring 29 is prevented from interfering with the motor housing portion 32b by positioning the small-diameter circumferential portion 29e at a circumferential position corresponding to the circumferential position of the motor housing portion 32b of the motor housing portion 32. Although the rear cam ring 21 and the power varying ring 29 are rotated when a power varying operation is carried out, the ranges of formation of the small-diameter flange 21f and the small-diameter circumferential portion 29e are predetermined so that the small-diameter flange 21f and the small-diameter circumferential portion 29e are always positioned at a circumferential position corresponding to the circumferential position of the motor housing portion 32b. The power varying ring 29 can be formed into a C-shape without having a portion corresponding to the small-diameter circumferential portion 29e; however, it is desirable that the power varying ring 29 be a completely (non-discontinuous) annular member from the viewpoint of securing strength. Hence, with respect to securing sufficient strength while preventing the power varying ring 29 from interfering with the motor housing portion 32b of the auto iris unit 32, it is effective to form the power varying ring 29 into a shape having the small-diameter circumferential portion 29e. The pair of intermediate circumferential portions 29d that are positioned on the circumferentially-opposite sides of the small-diameter circumferential portion 29e are formed to be greater in diameter (and to have a greater wall thickness) than the small-diameter circumferential portion 29e and to be elongated in the optical axis direction so as to have a sufficient strength to achieve stable rotation of the power varying ring 29. Additionally, the pair of intermediate circumferential portions 29d are located at positions so not to overlap the three set screws 40, as viewed from the rear of the variable power lens 10, by forming the pair of intermediate circumferential portions 29d so as to be smaller in diameter than the large-diameter circumferential portion 29c, which makes it easy to access to the three set screws 40, thus contributing to an improvement in workability. The large-diameter circumferential portion 29c prevents the internal structure of the variable power lens 10 from being visible through the through-hole 33a of the rear cover 33.

In the present embodiment of the variable power lens 10, because the front cam ring 20 serves both as a cam ring for power variation control and as an advancing/retracting member for focusing, the drive system for power variation and the drive system for focusing are configured so as not to transmit unnecessary motion thereof to each other (e.g., movements of the front cam ring 20 in the optical axis direction when a focusing operation is performed and rotational movements of the front cam ring 20 when a power varying operation is performed). More specifically, as described above, the front-end flange 20b of the front cam ring 20 is held between the front-end flange 23b of the focus ring 23 and the radially inner flange 22a of the focus-ring retaining ring 22 in a manner to be allowed to rotate relative to the front-end flange 23b and the radially inner flange 22a, and neither the focus ring 23 nor the focus-ring retaining ring 22 is rotated since the front-end flange 20b rotates relative to the front-end flange 23b and the radially inner flange 22a when a power varying operation, in which the front cam ring 20 rotates with the rear cam ring 21, is performed. Therefore, no movement in the optical axis direction between the stationary frame 11 and the combination of the focus-ring retaining ring 22 and the focus ring 23 is caused by the focusing helicoid 24. On the other hand, when a focusing operation is performed, in which a combination of the focus ring 23 and the focus-ring retaining ring 22 moves in the optical axis direction while rotating, the front cam ring 20 is not rotated because the front-end flange 23b and the radially inner flange 22a rotate relative to the front-end flange 20b. Accordingly, the front-lens-group support frame 30 does not move in the optical axis direction via the front cam groove 20c in a focusing operation, so that the position of the front-lens-group support frame 30 in the optical axis direction is controlled only by the focusing helicoid 24. The front-end flange 20b of the front cam ring 20 is pressed against the radially inner flange 22a of the focus-ring retaining ring 22 by the biasing force of the front-cam-ring biasing spring 25, thereby the front cam ring 20, the focus-ring retaining ring 22 and the focus ring 23 being coupled together with backlash and play therebetween being removed; however, the magnitude of the biasing force of the front-cam-ring biasing spring 25 is set at an appropriate magnitude to such a degree so as not to interfer with relative rotation among the front cam ring 20, the focus-ring retaining ring 22 and the focus ring 23 (i.e., to such a degree to prevent the front cam ring 20 from following the combined rotational movement of the focus-ring retaining ring 22 and the focus ring 23, or vice versa, due to friction produced therebetween) when a power varying operation or a focusing operation is performed.

Figure 25:
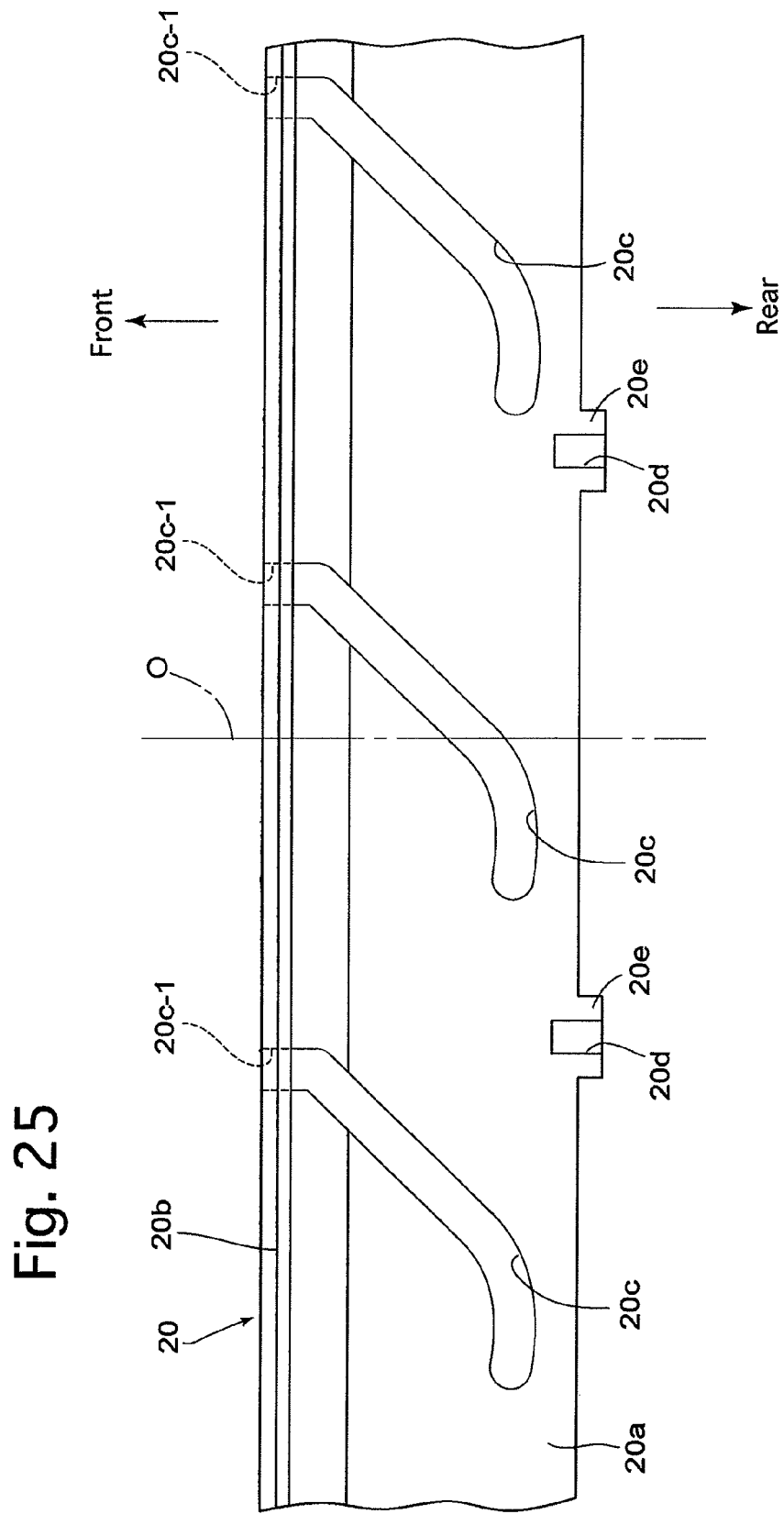
FIG. 25 is a developed plan view of the front cam ring.
Figure 26:
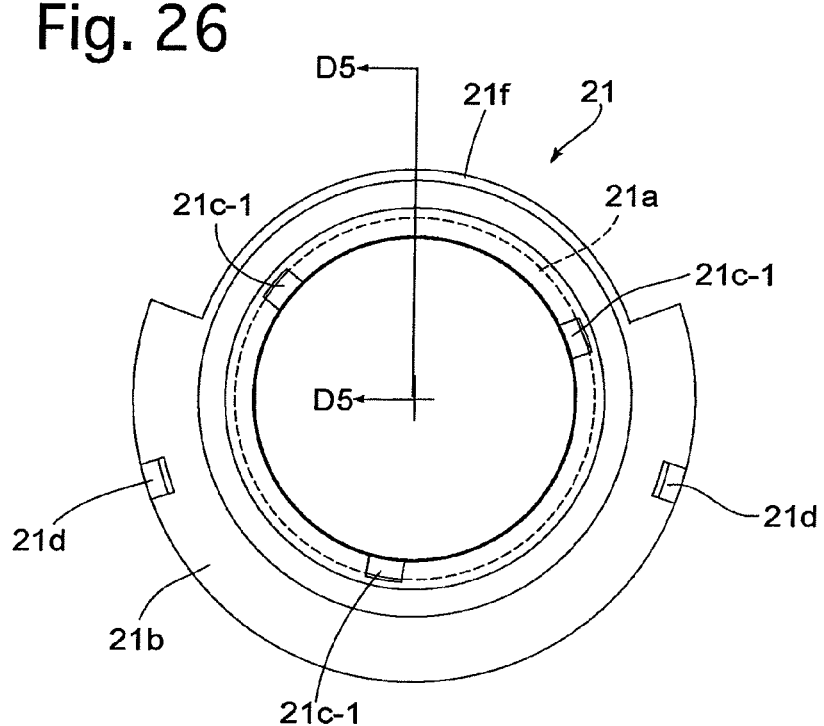
FIG. 26 is a rear elevational view of the rear cam ring, viewed from front in the optical axis direction.
Figure 28:
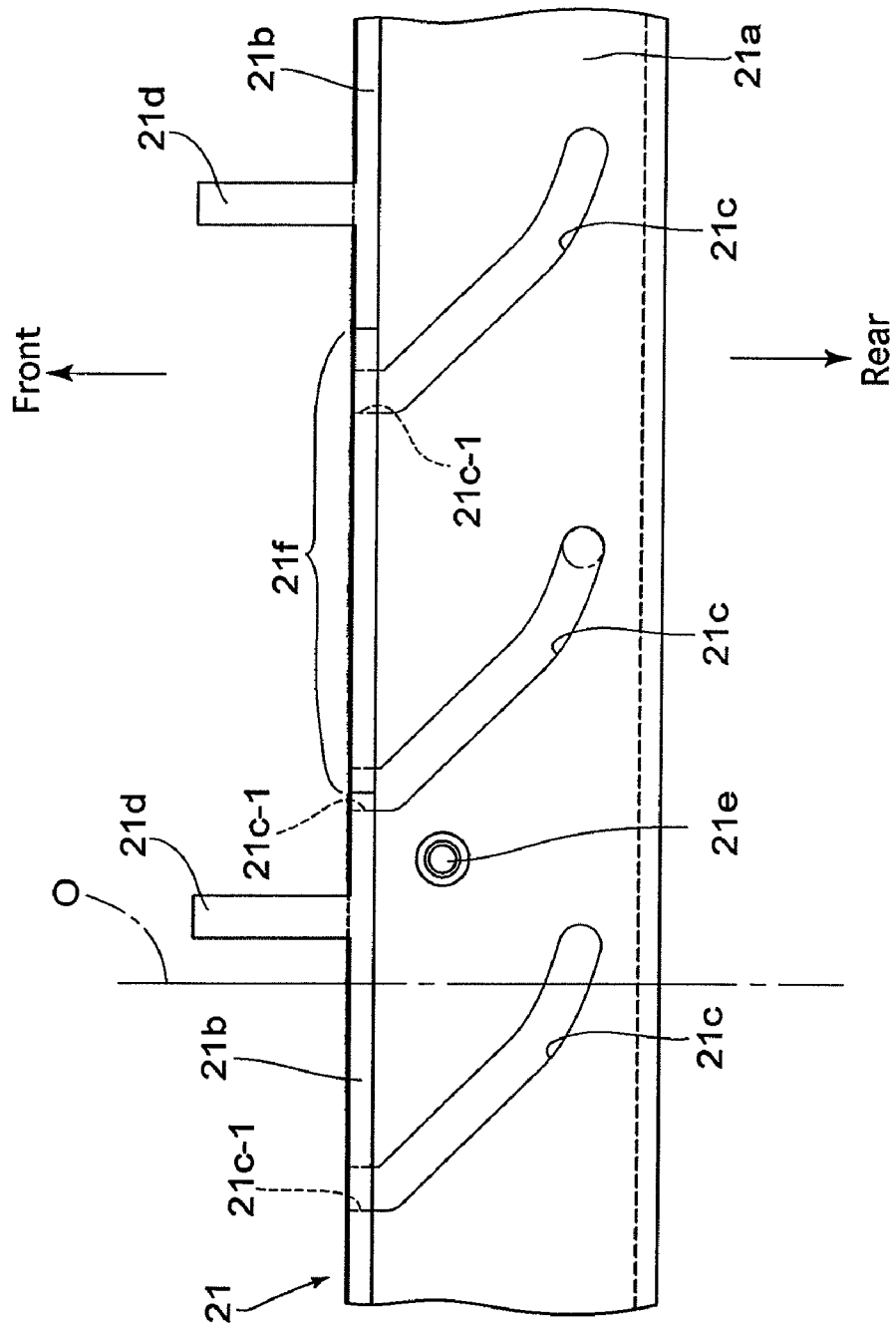
FIG. 28 is a developed plan view of the rear cam ring.

The settings of the inclination angles of each cam groove (each front cam groove 20c and each rear cam grooves 21c) and the focusing helicoid 24 (the outer surface helicoid 11h and the inner surface helicoid 23a) relative to the optical axis O have also been devised in order to contribute to ensuring the prevention of the aforementioned following rotational movement between the front cam ring 20 and the combination of the focus-ring retaining ring 22 and the focus ring 23. As shown in FIGS. 25 and 28, the working ranges of each front cam groove 20c and each rear cam groove 21c are inclined to the optical axis O at an angle of approximately 45 degrees. In addition, the directions of inclination of each front cam groove 20c and each rear cam groove 21c relative to the optical axis O are substantially opposite to each other. On the other hand, although the outer surface helicoid 11h and the inner surface helicoid 23a, which form the focusing helicoid 24, are identical to the front cam groove 20c in inclination direction relative to the optical axis O, the angle of this inclination is approximately 3 degrees, which is considerably different from the inclination angle of the front cam groove 20c that is approximately 45 degrees. By making the cam grooves for power variation control (i.e., the three front cam grooves 20c and the three rear cam grooves 21c) and the focusing helicoid 24 (i.e., the outer surface helicoid 11h and the inner surface helicoid 23a) different in inclination angle from each other in such a manner, a resistant force to rotation of the focus ring 23 is produced on the front and rear cam rings 20 and 21 while the front cam ring 20 moves solely in the optical axis direction without following the rotational movement of the focus ring 23 when the focus ring 23 is rotated. In addition, when the front and rear cam rings 20 and 21 are rotated to perform a power varying operation, a resistant force to rotations of the front and rear cam rings 20 and 21 is produced on the focus ring 23, so that only the front cam ring 20 can be rotated at a fixed position in the optical axis direction without rotating the focus ring 23.

Although the above embodiment of the variable power lens includes the focus-ring retaining ring 22 and the front-cam-ring biasing spring 25 as a structure for coupling the front cam ring 20 and the focus ring 23 to each other, it is possible that the variable power lens be structured so as to exclude such elements as the focus-ring retaining ring 22 and the front-cam-ring biasing spring 25 according to a second embodiment of the variable power lens shown in FIGS. 32 through 38. Components and portions in the second embodiment of the variable power lens (10') which correspond to those in the first embodiment of the variable power lens are designated with the same reference numerals and the descriptions of such components and portions have been omitted.

Figure 32:
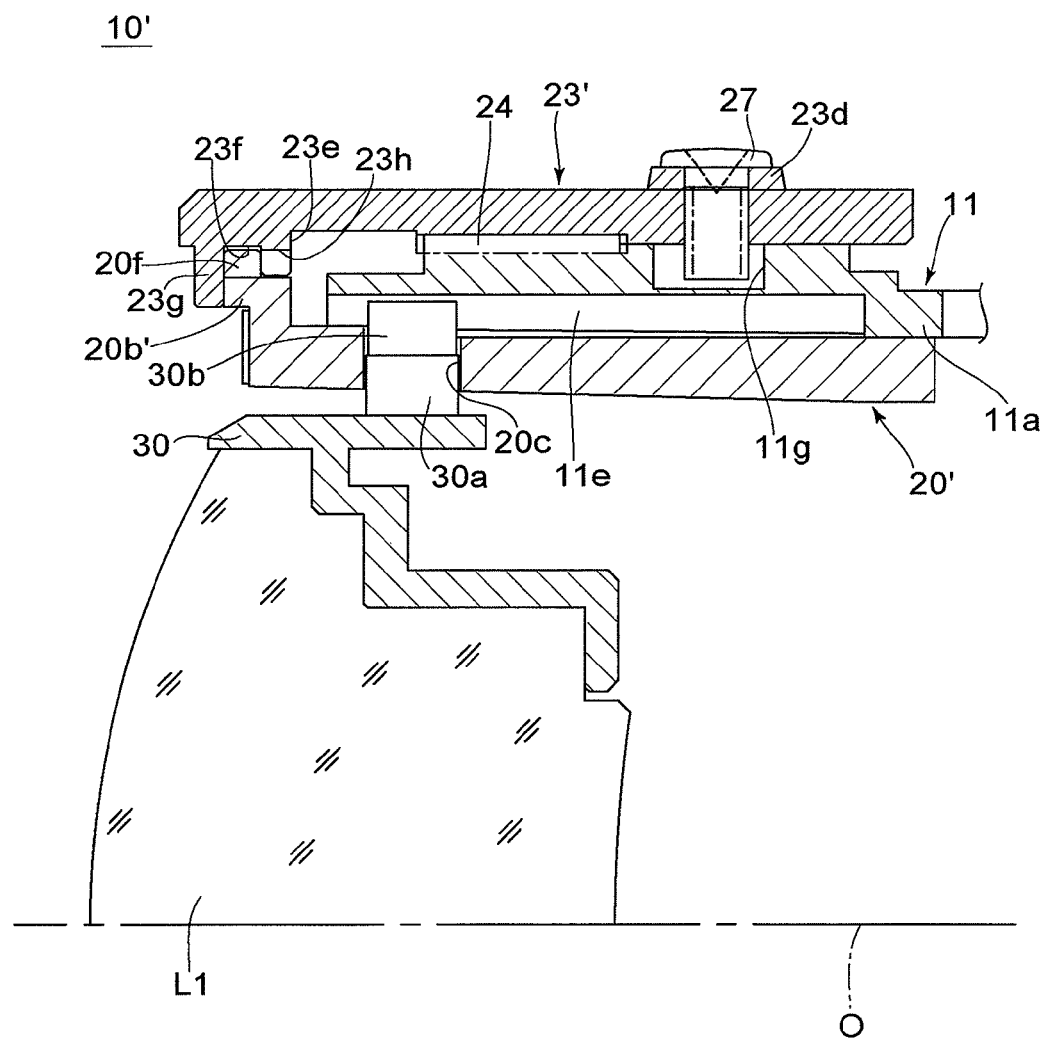
FIG. 32 is a cross sectional view of a main part of a second embodiment of the variable power lens that is different in coupling structure between the focus ring and the front cam ring from the first embodiment of the variable power lens.
Figure 33:
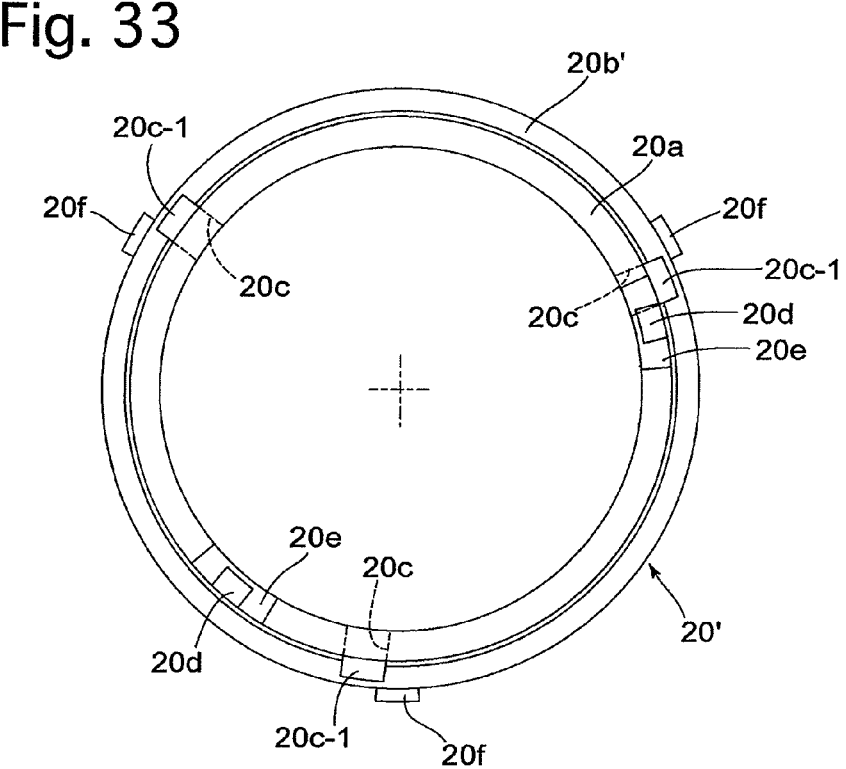
FIG. 33 is a rear elevational view of a front cam ring in the second embodiment of the variable power lens, viewed from rear in an optical axis direction.
Figure 34:
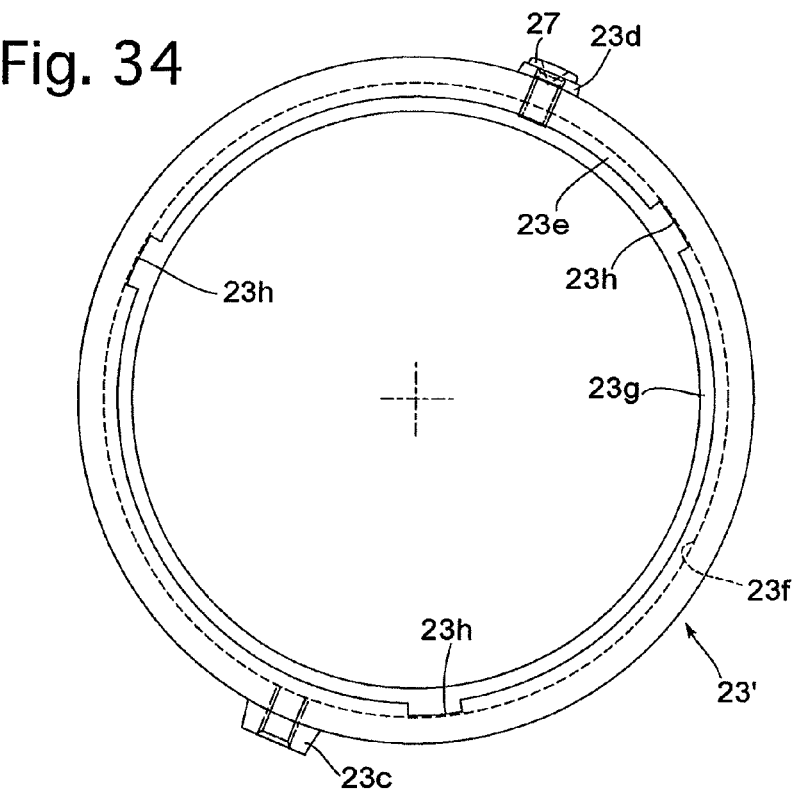
FIG. 34 is a rear elevational view of a focus ring in the second embodiment of the variable power lens, viewed from rear in the optical axis direction.

As shown in FIGS. 32 and 33, a front cam ring 20' in the second embodiment of the variable power lens 10' is formed so that the amount of projection of a front-end flange 20b' in a radially outward direction is smaller than that of the front-end flange 20b of the first embodiment of the variable power lens, and the front cam ring 20' is further provided on the front-end flange 20b' thereof with three retaining lugs (elements of a focus ring coupler) 20f which project radially outwards from the front-end flange 20b'. The three retaining lugs 20f are arranged at substantially equi-angular intervals in the circumferential direction. On the other hand, as shown in FIGS. 32 and 34, a focus ring 23' of the second embodiment of the variable power lens 10' is provided with a retaining flange (an element of the focus ring coupler/lug-engaging portion) 23e which is formed at a position corresponding to the position in the optical axis direction of the front-end flange 23b of the first embodiment, and is further provided in front of the retaining flange 23e with a radially inner flange (an element of the focus ring coupler/lug-engaging portion) 23g, with a lug-guide space (an element of the focus ring coupler/lug-engaging portion) 23f being formed between the retaining flange 23e and the radially inner flange 23g. The radially inner flange 23g is integrally formed with the focus ring 23'. The radially inner flange 23g is shaped into a completely annular member similar to the radially inner flange 22a of the focus-ring retaining ring 22 of the first embodiment of the variable power lens 10, whereas the retaining flange 23e is provided, at equi-angular intervals in the circumferential direction, with three lug insertion/removable holes (elements of the focus ring coupler/lug-engaging portion) 23h which extend through the retaining flange 23e in the optical axis direction.

A focus ring coupler including the front-end flange 20b', the lug-guide space 20f, the retaining flange 23e, the lug-guide space 23f, the radially inner flange 23g and the lug insertion/removable holes 23h, together with the focusing helicoid 24 constitute a focusing operation mechanism of the drive-ring movement controller according to the second embodiment.

Figure 35:
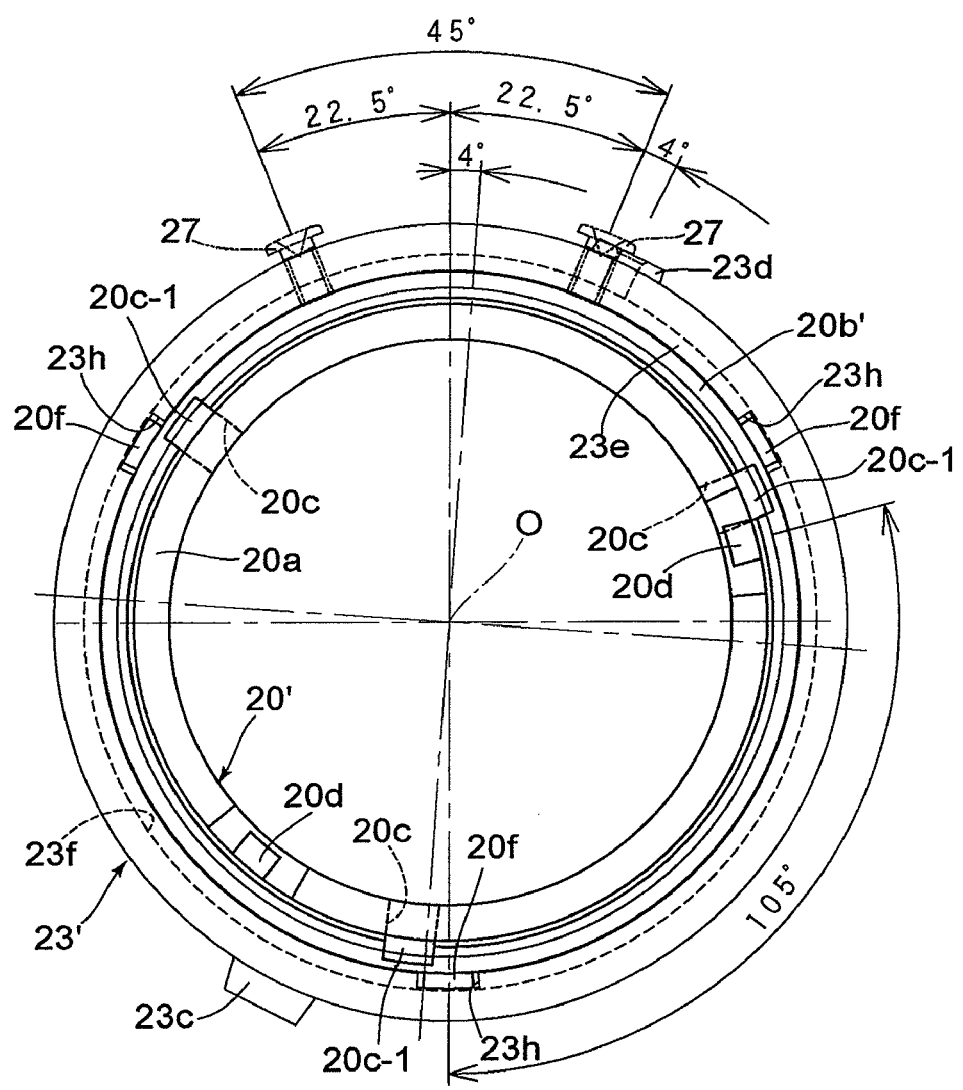
FIG. 35 is a rear elevational view of the focus ring and the front cam ring in the second embodiment of the variable power lens, viewed from rear in the optical axis direction, showing a relative angular position between the focus ring and the front cam ring at which the focus ring and the front cam ring can be attached to and detached from each other.

FIG. 35 shows the angular position between the front cam ring 20' and the focus ring 23' at which the front cam ring 20' and the focus ring 23' can be attached to and detached from each other. The three retaining lugs 20f that are formed on the front cam ring 20' are positioned to correspond to the three lug insertion/removable holes 23h of the focus ring 23' and can all be inserted into and removed from the lug-guide space 23f through the associated three lug insertion/removable holes 23h, respectively. The two positions of the limit screw 27 shown by two-dot chain lines in FIG. 35 show the range of rotation of the focus ring 23' (approximately 45 degrees) relative to the stationary frame 11 when the focus ring 23' is manually operated. More specifically, the limits of rotation of the focus ring 23' are determined by engagements of the limit screw 27 with the circumferentially opposite ends of the circumferential groove 11g, respectively. This rotation limit structure is the same as that of the focus ring 23 of the first embodiment of the variable power lens. In FIG. 35, the attachable/detachable position at which the front cam ring 20' and the focus ring 23' can be attached to and detached from each other is set at a position approximately 4 degrees away from one rotation limit (the right rotation limit as viewed in FIG.

Figure 36:
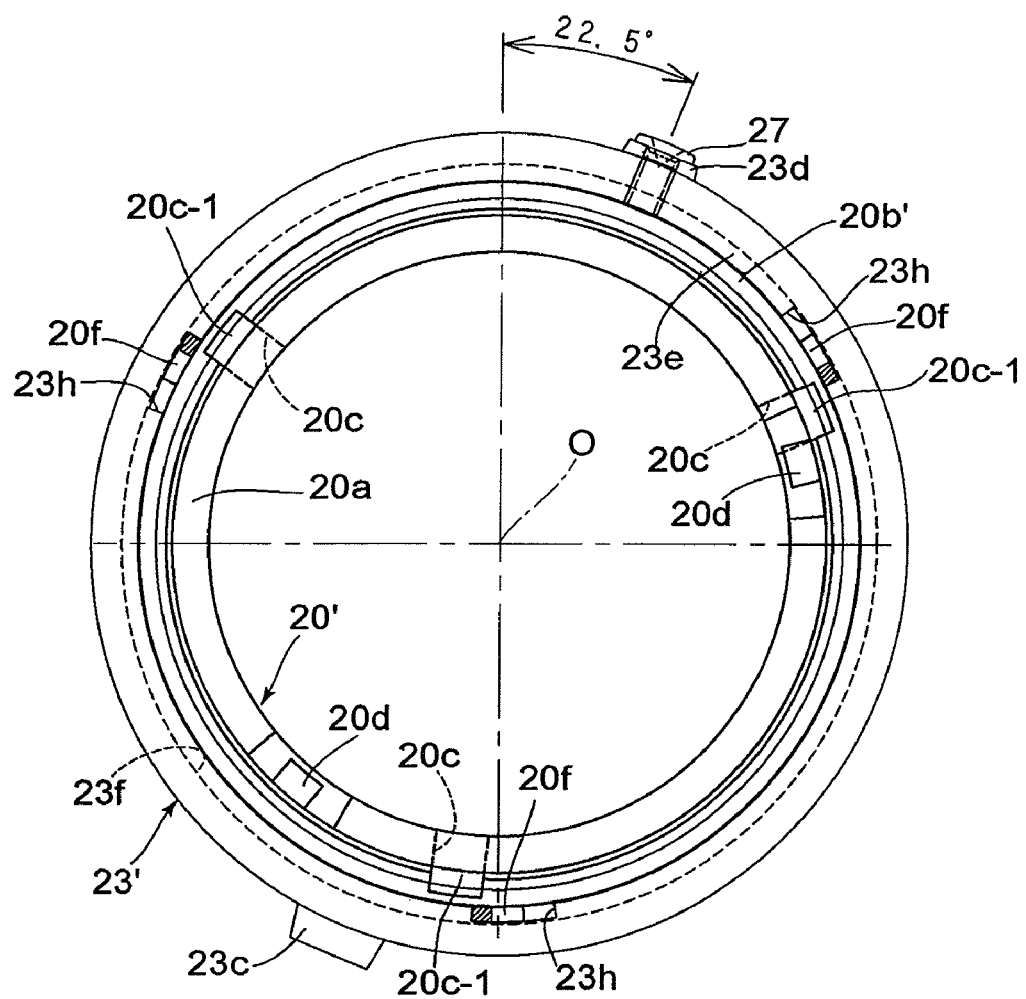
FIG. 36 is a rear elevational view of the focus ring and the front cam ring in the second embodiment of the variable power lens, viewed from rear in the optical axis direction, showing the angular position between the focus ring and the front cam ring in a state where the focus ring is positioned at one rotation limit thereof for focusing.

35) of the focus ring 23'. Accordingly, the focus ring 23' never reaches the rotational position (angular position) shown in FIG. 35 relative to the front cam ring 20' in a normal state, and can be rotated to this rotational position only when the limit screw 27 is removed. As shown in FIG. 36, if the focus ring 23' is rotated to an angular position thereof at which the limit screw 27 can be brought into the circumferential groove 11g of the stationary frame 11, each of the three retaining lugs 20f partly moves into a position behind the retaining flange 23e (a position between the retaining flange 23e and the radially inner flange 23g), which prevents the front cam ring 20' and the focus ring 23' from moving relative to each other in the optical axis direction, thus being in a non-disengageable state.

Figure 37:
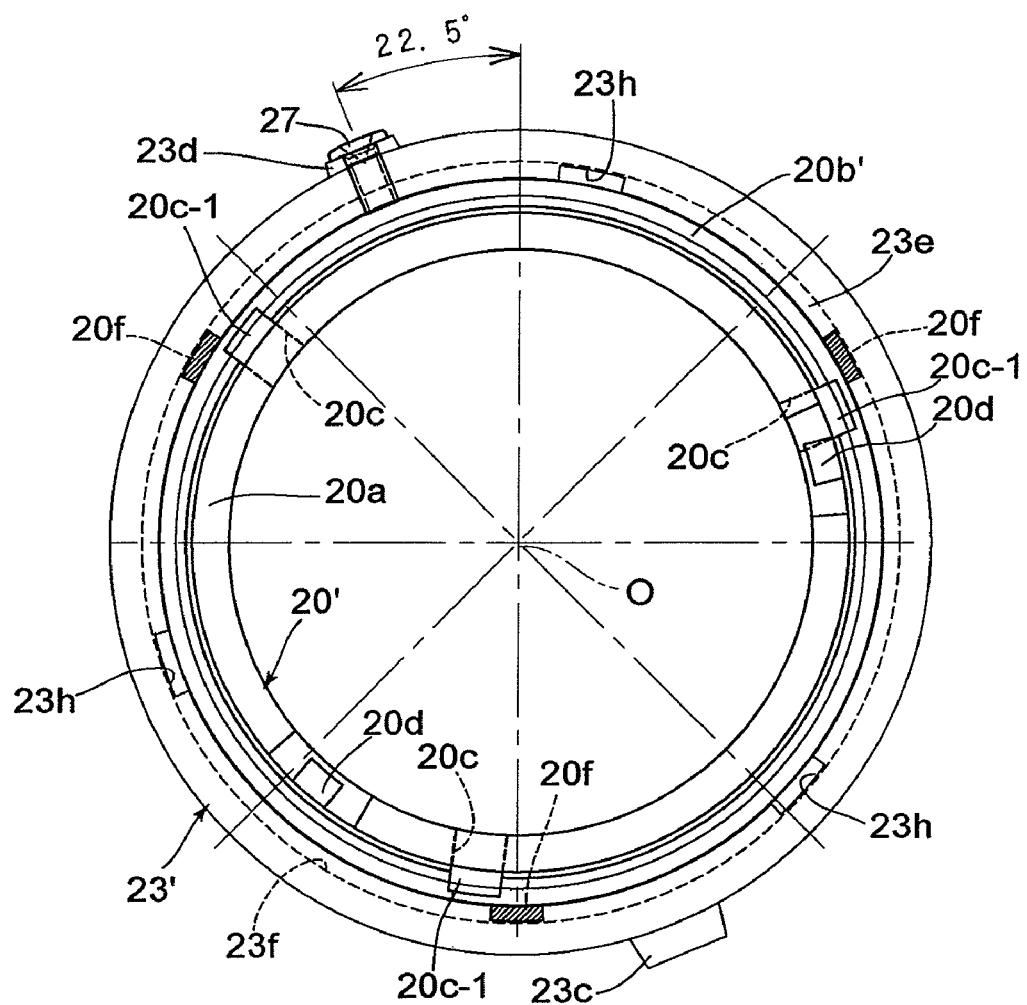
FIG. 37 is a view similar to that of FIG. 36, showing the angular position between the focus ring and the front cam ring in a state where the focus ring is positioned at the other rotation limit thereof for focusing.

FIG. 37 shows a state where the focus ring 23' has been fully rotated to one rotation limit thereof (by an angle of approximately 45 degrees from the state shown in FIG. 36) at which the limit screw 27 comes in contact with the other end of the circumferential groove 11g with the state shown in FIG. 36 being taken as a reference. As can be understood from FIG. 37, the front cam ring 20' and the focus ring 23' remain prevented from moving relative to each other in the optical axis direction since the entire part (shown by oblique lines in FIG. 37) of each retaining lug 20f is positioned behind the retaining flange 23e (at a position between the retaining flange 23e and the radially inner flange 23g). This state where the focus ring 23' is prevented from coming off the front cam ring 20' by the engagement between the three retaining lugs 20f and the retaining flange 23e is maintained when the focus ring 23' is positioned at any given angular position between the position shown in FIG. 36 and the position shown in FIG. 37. Namely, in a normal working state in which the limit screw 27 is engaged in the circumferential groove 11g, the coupling of the focus ring 23' to the front cam ring 20' is not released (not disengaged) regardless of the angular position to which the focus ring 23' is rotated within the range of rotation thereof.

Figure 38:
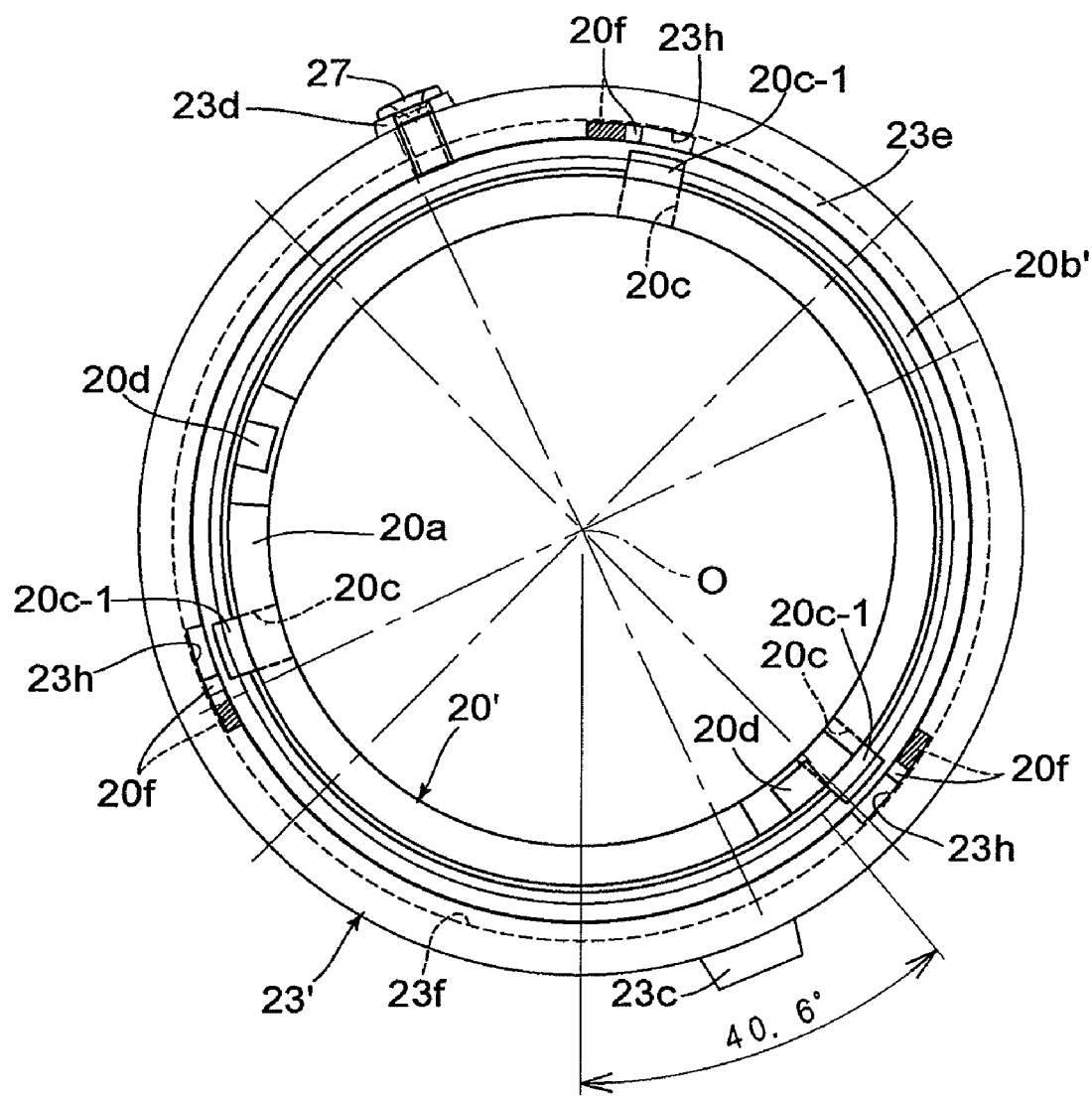
FIG. 38 is a view similar to that of FIG. 36, showing the angular position between the focus ring and the front cam ring in a state where the front cam ring has been rotated by the maximum angle of rotation for power variation from the state shown in FIG. 37.

Similar to the first embodiment of the variable power lens, the front cam ring 20' is rotated without the focus ring 23' being rotated when a power varying operation is performed in the second embodiment of the variable power lens. FIG. 38 shows a state where the front cam ring 20' has been fully rotated clockwise by the maximum angle of rotation for power variation (approximately 64.4 degrees) from the state shown in FIG. 37, upon which a focus adjustment has been carried out. The front cam ring 20' and the focus ring 23' remain prevented from moving relative to each other in the optical axis direction since portion of each retaining lug 20f (shown hatched in FIG. 38) is positioned behind the retaining flange 23e (position between the retaining flange 23e and the radially inner flange 23g) even in the state shown in FIG. 38. Accordingly, in a normal working state, the coupling of the focus ring 23' with the front cam ring 20' is not released (not disengaged) regardless of the angular position to which the focus ring 23' is rotated within the range of rotation thereof.

In this manner, it is also possible that the front cam ring 20' and the focus ring 23' be coupled to each other via a bayonet coupling in such a manner as to be capable of rotating relative to each other and to be prevented from moving relative to each other in the optical axis direction. In this case also, the effect of reducing the number of elements in particular can be achieved since no extra part for coupling the front cam ring 20' and the focus ring 23' to each other is separately required.

Although the present invention has been discussed with reference to the above described embodiments, the present invention is not limited to these particular embodiments. For instance, the present invention can also be applied to another type of variable power lens for imaging devices though each of the above described embodiments is an example of a variable power lens for CCTV cameras to which the present invention has been applied. In addition, the present invention can be applied to either of the following two types of variable power lenses: zoom lenses, in which the focal length can be varied continuously so that the position of the image plane remains unchanged (i.e., the image remains in focus) at all times, and varifocal lenses, in which focal length can be varied continuously though the position of the image plane changes as the focal length changes.

In addition, although a lens group driver for power variation control is composed of the three front cam grooves 20c of the front cam ring 20 (20') and the three rear cam grooves 21c of the rear cam ring 21 while a lens group driver for focusing is composed of the focusing helicoid 24 in the above illustrated embodiments of the variable power lenses, so long as each lens group driver provides movement to a lens group(s) by rotation so that the lens group(s) advances and retracts in an optical axis direction, the lens group driver for power variation control and the lens group driver for focusing are not limited to cam grooves and a helicoid, respectively. For instance, instead of the front cam ring 20 (20') and the rear cam ring 21 in the above described embodiments, a front helicoid ring and a rear helicoid ring, each of which has a helicoid on a peripheral surface thereof, can serve as the front (first) lens group drive ring and the rear (second) lens group drive ring, respectively.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A variable power lens provided with an imaging optical system including at least a first lens group and a second lens group which are movable in an optical axis direction, said variable power lens comprising:

a first lens group support frame and a second lens group support frame which support said first lens group and said second lens group, respectively;

a linear guide ring which linearly guides each of said first lens group support frame and said second lens group support frame in said optical axis direction;

a power-variation operating member;

a focus operating member;

a first lens group drive ring which moves said first lens group support frame in said optical axis direction by rotation of said first lens group drive ring relative to said linear guide ring;

a second lens group drive ring which moves said second lens group support frame in said optical axis direction by rotation of said second lens group drive ring relative to said linear guide ring;

a drive ring coupler which couples said first lens group drive ring and said second lens group drive ring with each other in a manner to prevent said first lens group drive ring and said second lens group drive ring from rotating relative to each other while allowing said first lens group drive ring and said second lens group drive ring to move relative to each other in said optical axis direction; and a drive-ring movement controller which integrally rotates said first lens group drive ring and said second lens group drive ring via said drive ring coupler with a relative distance therebetween in said optical axis direction remaining unchanged when said power-variation operating member is manually operated, and moves only one of said first lens group drive ring and said second lens group drive ring in said optical axis direction without rotation when said focus operating member is manually operated.

2. The variable power lens according to claim 1, further comprising a light-quantity controller installed at a position in said optical axis direction between said first lens group drive ring and said second lens group drive ring,
wherein said drive ring coupler comprises:
at least one rotation transmission key which passes through a space immediately beside said light-quantity controller to extend in said optical axis direction from one of said first lens group drive ring and said second lens group drive ring; and
at least one key groove which is provided on the other of said first lens group drive ring and said second lens group drive ring, wherein said key groove is engaged with said rotation transmission key so as to be slidably movable in said optical axis direction and to prevent relative rotation between the first lens group drive ring and the second lens group drive ring.

3. The variable power lens according to claim 2, wherein said linear guide ring comprises:
a large-diameter cylinder and a small-diameter cylinder which are mutually different in diameter and coaxially arranged, said large-diameter cylinder being positioned in front of said small-diameter cylinder in said optical axis direction; and
a middle flange which extends radially to connect said large-diameter cylinder and said small-diameter cylinder to each other,
wherein said first lens group drive ring and said second lens group drive ring comprise:
a front lens group drive ring which includes one of said rotation transmission key and said key groove, and is positioned inside said large-diameter cylinder and supported thereby to be rotatable relative to said large-diameter cylinder about said optical axis and movable relative to said large-diameter cylinder in said optical axis direction; and
a rear lens group drive ring which includes the other of said rotation transmission key and said key groove, and is positioned outside said small-diameter cylinder and supported thereby to be rotatable relative to said small-diameter cylinder about said optical axis, and
wherein at least one through-hole is provided through said middle flange in said optical axis direction, said rotation transmission key passing through said through-hole to extend in said optical axis direction.

4. The variable power lens according to claim 3, wherein said light-quantity controller is inserted into an internal space of said large-diameter cylinder and is supported thereby, said internal space being adjacent to said middle flange, and
wherein an insertion space is provided between an inner surface of said large-diameter cylinder and a side of said light-quantity controller so that said rotation transmission key can pass through said through-hole and said insertion space to extend in said optical axis direction.

5. The variable power lens according to claim 3, wherein said power-variation operating member comprises a power varying ring which is positioned around said rear lens group drive ring and supported thereby so as to rotate integrally with said rear lens group drive ring.

6. The variable power lens according to claim 5, wherein said focus operating member comprises a focus ring which is positioned around said large-diameter cylinder and supported thereby so as to move in said optical axis direction relative to said linear guide ring when being rotated manually,
wherein said drive-ring movement controller comprises a focus ring coupler which couples said focus ring and said front lens group drive ring to each other in a manner to allow said focus ring and said front lens group drive ring to rotate relative to each other and to prevent said focus ring and said front lens group drive ring from moving relative to each other in said optical axis direction, and
wherein said focus ring coupler prevents said front lens group drive ring from rotating in association with rotation of said focus ring when said focus ring is rotated, and prevents said focus ring from rotating in association with rotation of said front lens group drive ring when said front lens group drive ring is rotated via said power varying ring.

7. The variable power lens according to claim 2, wherein a pair of said rotation transmission keys are provided at different circumferential positions, and
wherein a pair of said key grooves are provided at different circumferential positions to correspond to said pair of rotation transmission keys.

8. The variable power lens according to claim 1, wherein said linear guide ring comprises a large-diameter cylinder and a small-diameter cylinder which are coaxially arranged and mutually different in diameter, said large-diameter cylinder being positioned in front of said small-diameter cylinder in said optical axis direction,
wherein said first lens group drive ring and said second lens group drive ring comprise:
a front lens group drive ring which is positioned inside said large-diameter cylinder and supported thereby to be rotatable relative to said large-diameter cylinder about said optical axis and movable relative to said large-diameter cylinder in said optical axis direction; and
a rear lens group drive ring which is positioned outside said small-diameter cylinder and supported thereby to be rotatable relative to said small-diameter cylinder about said optical axis,
wherein said power-variation operating member includes a power varying ring which is provided around said rear lens group drive ring and supported thereby so as to rotate integrally with said rear lens group drive ring,
wherein said focus operating member includes a focus ring which is provided around said large-diameter cylinder and supported thereby so as to move in said optical axis direction relative to said linear guide ring when being rotated manually,
wherein said drive-ring movement controller comprises a focus ring coupler which couples said focus ring and said front lens group drive ring to each other in a manner to allow said focus ring and said front lens group drive ring to rotate relative to each other and to prevent said focus ring and said front lens group drive ring from moving relative to each other in said optical axis direction, and
wherein said focus ring coupler prevents said front lens group drive ring from rotating in association with rotation of said focus ring when said focus ring is rotated, and prevents said focus ring from rotating in association with rotation of said front lens group drive ring when said front lens group drive ring is rotated via said power varying ring.

9. The variable power lens according to claim 6, wherein said focus ring coupler comprises:
- an annular flange formed on said front lens group drive ring to project radially outwards;
- a retaining ring which is detachably attached to a front end of said focus ring to prevent said annular flange of said front lens group drive ring from moving forward relative to said focus ring; and
- a biaser which biases said front lens group drive ring forward to bring said annular flange into contact with said retaining ring.

10. The variable power lens according to claim 6, wherein said focus ring coupler comprises:
- a plurality of retaining lugs formed on said front lens group drive ring at different circumferential positions to project radially outwards; and
- a lug-engaging portion formed on said focus ring to allow all of said plurality of retaining lugs to be engaged therewith and disengaged therefrom when said focus ring is positioned at a specific rotational position relative to said front lens group drive ring,
- wherein said lug-engaging portion prevents said focus ring from moving in said optical axis direction relative to said front lens group drive ring by being engaged with at least part of said plurality of retaining lugs when said focus ring is positioned at a rotational position other than the specific rotational position, relative to said front lens group drive ring.

11. The variable power lens according to claim 6, wherein an inner peripheral surface of said focus ring and an outer peripheral surface of said linear guide ring comprise a female helicoid and a male helicoid, respectively, which are screw-engaged with each other, a rotation of said focus ring causing said focus ring to move in said optical axis direction relative to said linear guide ring due to a screw-engagement between said female helicoid and said male helicoid.

12. The variable power lens according to claim 8, wherein said focus ring coupler comprises:
- an annular flange formed on said front lens group drive ring to project radially outwards;
- a retaining ring which is detachably attached to a front end of said focus ring to prevent said annular flange of said front lens group drive ring from moving forward relative to said focus ring; and
- a biaser which biases said front lens group drive ring forward to bring said annular flange into contact with said retaining ring.

13. The variable power lens according to claim 8, wherein said focus ring coupler comprises:
- a plurality of retaining lugs formed on said front lens group drive ring at different circumferential positions to project radially outwards; and
- a lug-engaging portion formed on said focus ring to allow all of said plurality of retaining lugs to be engaged therewith and disengaged therefrom when said focus ring is positioned at a specific rotational position relative to said front lens group drive ring,
- wherein said lug-engaging portion prevents said focus ring from moving in said optical axis direction relative to said front lens group drive ring by being engaged with at least part of said plurality of retaining lugs when said focus ring is positioned at a rotational position other than the specific rotational position, relative to said front lens group drive ring.

14. The variable power lens according to claim 8, wherein an inner peripheral surface of said focus ring and an outer peripheral surface of said linear guide ring comprise a female helicoid and a male helicoid, respectively, which are screw-engaged with each other, a rotation of said focus ring causing said focus ring to move in said optical axis direction relative to said linear guide ring due to a screw-engagement between said female helicoid and said male helicoid.

15. The variable power lens according to claim 1, wherein said first lens group drive ring and said second lens group drive ring comprise a first cam ring and a second cam ring each of which includes at least one cam groove on a peripheral surface thereof,
- wherein said first lens group support frame includes at least one cam follower which slidably engages in said cam groove of said first cam ring; and at least one linear guide projection which engages in a corresponding linear guide groove which is formed on said linear guide ring to extend in said optical axis direction, and
- wherein said second lens group support frame includes at least one cam follower which slidably engages in said cam groove of said second cam ring, and at least one linear guide projection which engages in a corresponding linear guide groove which is formed on said linear guide ring to extend in said optical axis direction.

16. The variable power lens according to claim 1, wherein said linear guide ring is a stationary member which is fixed to a mount member, said mount member enabling said variable power lens to be mounted to and dismounted from a camera body.

17. The variable power lens according to claim 1, wherein, when one of said first lens group drive ring and said second lens group drive ring is moved in said optical axis direction by an operation of said focus operating member, said movement of said one of said first lens group drive ring and said second lens group drive ring, which constitutes an amount of movement for focusing, is determined by taking into account a focus adjustment amount required to compensate a variation in position of a focal plane due to a power variation.

18. A variable power lens provided with an imaging optical system including at least a first lens group and a second lens group which are movable in an optical axis direction, said variable power lens comprising:
- a first lens group support frame and a second lens group support frame which support said first lens group and said second lens group, respectively;
- a linear guide ring which linearly guides each of said first lens group support frame and said second lens group support frame in said optical axis direction;
- a power-variation operating member;
- a focus operating member;
- a first lens group drive ring which moves said first lens group support ring frame in said optical axis direction by rotation of said first lens group drive ring relative to said linear guide ring;
- a second lens group drive ring which moves said second lens group support ring frame in said optical axis direction by rotation of said second lens group drive ring relative to said linear guide ring; and
- a drive ring coupler which couples said first lens group drive ring and said second lens group drive ring with each other in a manner to prevent said first lens group drive ring and said second lens group drive ring from rotating relative to each other while allowing said first lens group drive ring and said second lens group drive ring to move relative to each other in said optical axis direction;
- wherein said first lens group drive ring and said second lens group drive ring are integrally rotated with a relative distance therebetween in said optical axis direction remaining unchanged when said power-variation operating member is manually operated, and
wherein only one of said first lens group drive ring and said second lens group drive ring is moved in said optical axis direction without rotation when said focus operating member is manually operated.

* * * * *